US012727687B2

(12) United States Patent
Tanaka

(10) Patent No.: US 12,727,687 B2
(45) Date of Patent: Sep. 8, 2026

(54) PLATE PICKING-UP DEVICE

(71) Applicant: Kura Sushi, Inc., Sakai (JP)

(72) Inventor: Kunihiko Tanaka, Osaka (JP)

(73) Assignee: Kura Sushi, Inc.

( * ) Notice: Subject to any disclaimer, the term of this patent is extended or adjusted under 35 U.S.C. 154(b) by 50 days.

(21) Appl. No.: 18/889,566

(22) Filed: Sep. 19, 2024

(65) Prior Publication Data

US 2025/0380826 A1 Dec. 18, 2025

(30) Foreign Application Priority Data

Jun. 13, 2024 (JP) ................................ 2024-096294

(51) Int. Cl.

| | |
|---|---|
| ***A47F 10/06*** | (2006.01) |
| ***A47G 23/08*** | (2006.01) |
| ***B65G 47/52*** | (2006.01) |
| ***G06Q 30/04*** | (2012.01) |
| ***G06V 20/50*** | (2022.01) |
| ***G08B 21/18*** | (2006.01) |

(52) U.S. Cl.

CPC .............. *A47F 10/06* (2013.01); *A47G 23/08* (2013.01); *B65G 47/52* (2013.01); *G06Q 30/04* (2013.01); *G08B 21/18* (2013.01); *G06V 20/50* (2022.01)

(58) Field of Classification Search

CPC ......... A47F 10/06; A47G 23/08; B65G 47/52; G08B 21/18; G06Q 30/04; G06V 20/50

See application file for complete search history.

(56) References Cited

U.S. PATENT DOCUMENTS

| | | | | |
|---|---|---|---|---|
| 4,190,134 A * | 2/1980 | Kato | ........................ | A47F 10/06 186/46 |
| 6,550,632 B2 * | 4/2003 | Gubbini | ................... | A21C 9/08 221/13 |
| 2020/0031592 A1 * | 1/2020 | Ogawa | ................... | A47G 23/08 |

FOREIGN PATENT DOCUMENTS

| | | | | |
|---|---|---|---|---|
| CN | 110980273 A * | 4/2020 | ............. | A47G 23/08 |
| JP | H 11-164764 A | 6/1999 | | |
| JP | 2008132294 A | 6/2008 | | |
| JP | 5416288 B | 6/2012 | | |
| JP | 6231311 B | 1/2015 | | |
| JP | 2022110815 A | 7/2022 | | |
| WO | WO-2022009993 A1 * | 1/2022 | ............. | A47G 23/08 |

* cited by examiner

*Primary Examiner* — James R Bidwell

(74) *Attorney, Agent, or Firm* — Yusuke Hirai; Best Mode IP Law, PLLC

(57) ABSTRACT

A plate picking-up device removes a plate from a container with a lid on a conveying path that is configured to convey items including the container along a predetermined conveyance direction. The plate picking-up device includes: a gripping member that is configured to grip a circumferential edge of the plate; a moving member that is configured to move the gripping member at least in a horizontal direction; and a control unit that is configured to: control the moving member to horizontally move the gripping member to the circumferential edge of the plate placed in the container with the lid being open, and then control the gripping member to grip the circumferential edge of the plate; and control the moving member to remove the plate in the horizontal direction from the container while the circumferential edge of the plate is being gripped by the gripping member.

18 Claims, 9 Drawing Sheets

FIG. 9

PLATE PICKING-UP DEVICE

CROSS REFERENCE TO RELATED APPLICATION

This application is based on and claims the benefit of priority from Japanese Patent Application No. 2024-096294 filed on Jun. 13, 2024. The entire disclosure of the above application is incorporated herein by reference.

TECHNICAL FIELD

The present disclosure relates to a plate picking-up device that is configured to process items conveyed on a conveying path.

BACKGROUND

In a restaurant (such as a conveyor-belt sushi restaurant), a conveying device that conveys foods and drinks along a conveying path may be used. In this case, a plate on which a food or drink is placed is placed on the conveying path of the conveying device, and the food and drink on the plate is conveyed along the conveying path to the eating space of for customers. In some cases, such a restaurant performs various processes on items conveyed along the conveying path.

For example, if food and drink are conveyed with the top of the plate being open, the food and drink will tend to dry out. There is also a risk that other customers may accidentally or intentionally touch the food or drink. In view of this, the applicant of the present application has developed a container (a container for conveying food and drink) as described in JP5416288B2, which is incorporated herein by reference. The container includes a setting holder, a lid, and an open/close mechanism. A plate on which food and/or drink is served is placed on the setting holder. The lid is attached to the setting holder to be openable and closable to cover the upper part of the setting holder. The open/close mechanism closes the lid when the plate is placed on the setting holder. The open/close mechanism also opens the lid when the plate is removed from the setting holder.

According to the container described in JP5416288B2, food and drink are less likely to dry out. Further, it is also possible to reduce the possibility that customers accidentally touch the food or drink. On the other hand, even when the container is used, the taste of the food and drink may change. For example, if food and drink being conveyed by the conveying device are not taken out by customers for a long time, the taste of the food and drink will change. Therefore, restaurants need to remove foods and drinks that have been conveyed for a certain period of time or longer, together with plates, from the containers conveyed by the conveying device.

Therefore, the applicant of the present disclosure has further developed a removing device. The removing device includes a reciprocating mechanism and a removing mechanism. A movable body of the reciprocating mechanism approaches the conveying path by forward movement and moves away from the conveying path by backward movement. The removing mechanism is attached to the moving body and includes a removing piece that is capable of rotating back and forth. The removing device moves the moving body forward when the container with the lid being open passes thereby. When the removing piece attached to the moving body comes to a position above a front portion of the plate, the removing device rotates the removing piece downward to press the removing piece against the upper surface of the plate. This causes the front portion of the plate to be lowered and the rear portion of the plate to be raised. The removing device moves the moving body in the backward direction with the front portion of the plate being lowered and the rear portion of the plate being raised. This allows the removing device to pull out the plate from the container and collect the plate in a collection box.

SUMMARY

There has been a demand for a technique that can more appropriately process items conveyed on a conveying path. Here, an example will be described in which plate is removed from a container on the conveying path. The device described in Patent Document 1 pulls out a plate by bringing the removing piece into contact with only the top surface of the plate. As a result, the force applied to the plate is unstable, and the removing piece separates from the top surface of the plate, making it more likely that the plate will not be removed properly. In addition, the device described in Patent Document 1 pushes down the front portion of the plate to lift the rear portion of the plate before the plate is pulled out. As a result, the rear portion of the raised plate may come into contact with the lid or other part of the container, resulting in the plate not being properly removed. In other words, when processing conveyed items, unnecessary contact with other members may occur, and the processing may not be performed appropriately. As described above, with conventional techniques, it has been difficult to automatically and appropriately process items conveyed on a conveying path.

It is one objective in this disclosure to provide a plate picking-up device that is capable of automatically and appropriately processing items conveyed on a conveying path.

In one aspect of the present disclosure, a plate picking-up device is configured to remove a plate from a container with a lid on a conveying path on which items including the container are conveyed along a predetermined conveyance direction. The plate picking-up device includes: a gripping member that is configured to grip a circumferential edge of the plate; a moving member that is configured to move the gripping member at least in a horizontal direction; and a control unit that is configured to: control the moving member to move the gripping member in the horizontal direction to the circumferential edge of the plate placed in the container with the lid being open, and then control the gripping member to grip the circumferential edge of the plate; and control the moving member to remove the plate in the horizontal direction from the container while the circumferential edge of the plate is being gripped by the gripping member.

According to the plate picking-up device of the present disclosure, items conveyed on the conveying path are automatically and appropriately processed.

BRIEF DESCRIPTION OF DRAWING

FIG. 9 is a flowchart of a plate removing process executed by the plate picking-up device according to the present embodiment.

DESCRIPTION OF EMBODIMENTS

Summary

Figure 1:
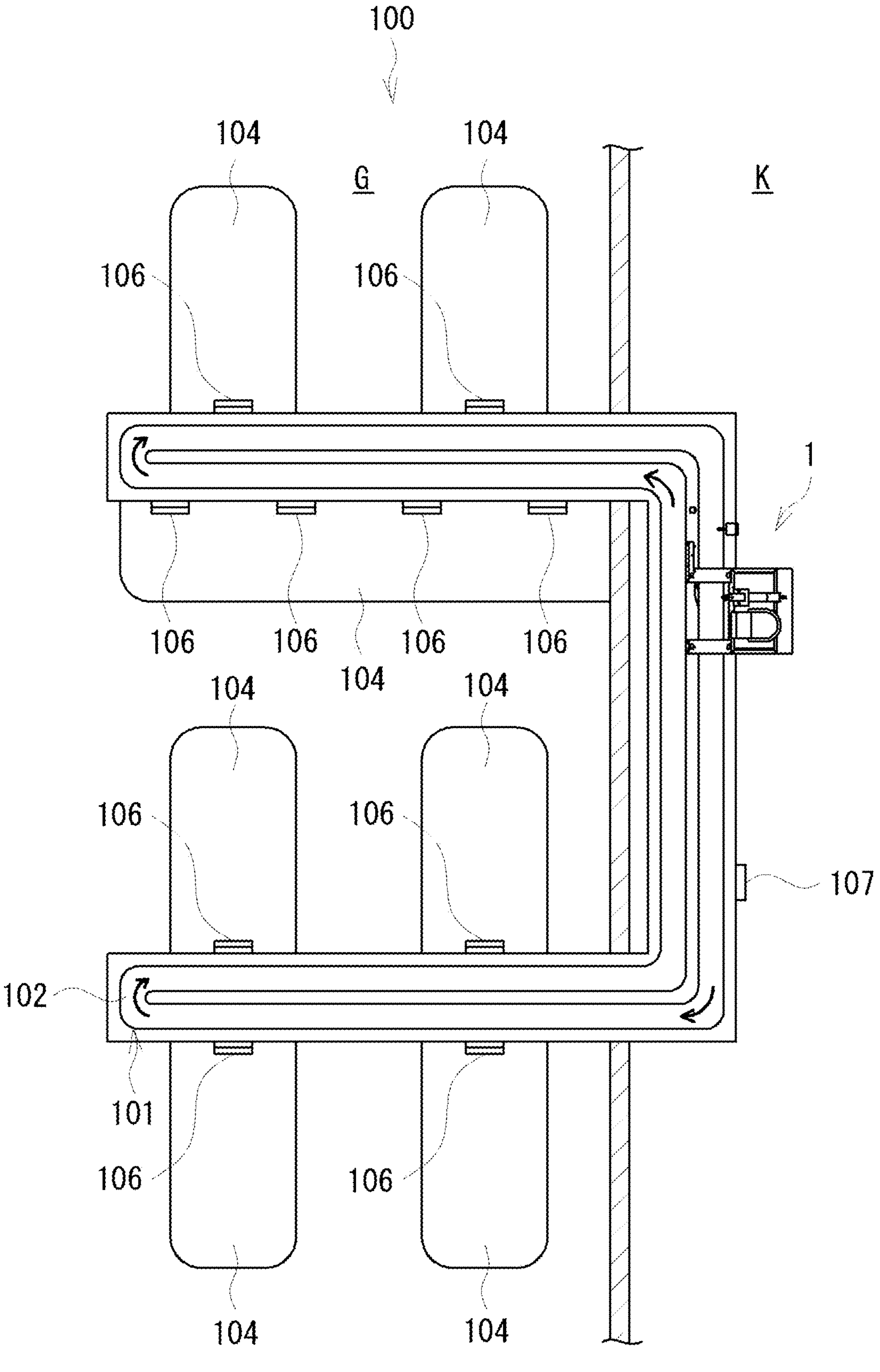
FIG. 1 is a plan view showing a schematic configuration of a restaurant conveying system in which a plate picking-up device according to an embodiment is installed.

The plate picking-up device exemplified in the present disclosure removes plates from containers that are conveyed along a conveying path. The conveying path conveys items (e.g., containers, etc.) along a predetermined conveyance direction. The container includes a setting holder, a lid, and an open/close mechanism. The table has a plate setting portion on which a plate with a food or a drink placed thereon is placed. The cover is attached to the setting holder to open and close. The open/close mechanism selectively opens and closes the lid. The plate picking-up device includes a gripping member, a moving member, and a control unit. The gripping member grips a part of a circumferential edge of the plate in a vertical direction. The moving member moves the gripping member at least in a horizontal direction. The control unit controls operation of the plate picking-up device. A picking-up unit, which includes a gripping member and a moving member, is disposed adjacent to the conveying path. The control unit executes a gripping step and a removing step. During the gripping step, the control unit controls the moving member to horizontally move the gripping member to a position close to the circumferential edge of the plate present in the container with the lid being open. Thereafter, the control unit controls the gripping member to grip the circumferential edge of the plate. During the removing step, the control unit controls the moving member while the circumferential edge of the plate is gripped by the gripping member. Accordingly, the plate is removed horizontally from the container.

According to the plate picking-up device of the present disclosure, the gripping member is moved horizontally to a position close to the circumferential edge of the plate in the container on the conveying path. Therefore, when the gripping member is brought close to the plate, other members of the plate picking-up device (such as the gripping member) are unlikely to come into contact with the lid of the container, the setting holder, and the like. The gripping member grips a portion of the circumferential edge of the plate in the vertical direction. As a result, the plate is held in a stable manner as compared to a situation where the plate is removed by a member that is in contact with only a top surface of the plate. Furthermore, with the circumferential edge of the plate being gripped by the gripping member, the plate is moved horizontally from the container. Therefore, when the plate is moved, the plate is less likely to come into contact with the lid, or the like, of the container. Thus, the plate is automatically and appropriately removed from the container.

It should be noted that the term "horizontal" in this disclosure is not necessarily limited to being strictly horizontal with respect to the ground. In the present disclosure, "horizontal" also includes a situation where the direction of movement of the gripping member is slightly angled relative to the actual horizontal plane to the extent that the plate can be smoothly removed from the container. In other words, the plate picking-up device may perform the gripping step and the removing step while the vertical position (height) of the gripping member is substantially fixed.

Here, a gap is formed between the upper surface of the setting holder on which the container is placed and the lower part of the lid in an open state. When removing a plate from the container during the removing step, the plate picking-up device may move the plate held by the gripping member horizontally using the moving member while the height of the plate held by the gripping member is kept within a vertical range of the gap. In this case, the possibility that the plate comes into contact with the lid of the container and the setting holder when the plate is moved can be further reduced.

Here, if the gripping member is moved only by linear movement, it would be necessary to install a collecting member for collecting the plate removed from the container between the picking-up unit of the plate picking-up device and the container. In view of this, the moving member may include a rotational movement portion that rotates and moves the gripping member in the horizontal direction about a rotational axis that extends in the vertical direction. Accordingly, it is unnecessary to use a collecting member for collecting the plate between the picking-up unit of the plate picking-up device and the container. As a result, freedom to utilize the space in the restaurant can be increased.

The rotational movement portion may rotate the gripping member back and forth within a predetermined angular range about the rotational axis extending in the vertical direction. In this case, by the gripping member rotating back and forth, both the operation of moving the gripping member to the plate and the operation of moving the plate gripped by the gripping member away from the container are appropriately performed. The direction in which the rotational axis of the rotational movement portion extends is not necessarily limited to the actual vertical direction. In other words, the rotational axis may be slightly angled relative to the actual vertical direction so long as the plate can be smoothly removed from the container.

During the removing step, the control unit may separate the plate from the container by rotating the gripping member in a direction following the conveyance direction using the rotational movement portion while the circumferential edge of the plate is gripped by the gripping member. Along the conveying path, other items (e.g., other containers, etc.) may be placed and conveyed at least on either the upstream side or the downstream side of the container in the conveyance direction (hereinafter, referred to as a "target container") from which the plate is to be removed. After the plate in the target container is gripped by the gripping member, the item located upstream of the target container in the conveyance direction moves in a direction for approaching the gripped plate. Therefore, if the gripping member rotates in the direction against (or opposite to) the conveyance direction during the removing step, there is a high possibility that the item located upstream of the target container in the conveyance direction would come into contact with the plate gripped by the gripping member. On the other hand, an item downstream of the target container in the conveyance direction moves in a direction away from the gripped plate after the plate in the target container was gripped by the gripping member. Therefore, by rotating and moving the gripping member in a direction following the conveyance direction during the removing step, the plate picking-up device reduces the possibility that the plate gripped by the gripping member comes into contact with other items on the conveying path. At the same time, the plate picking-up device can smoothly remove the plate from the target container.

The moving member may include a linear movement portion that moves the gripping member horizontally in a linear manner in a direction for changing the distance between the gripping member and the conveying path. In other words, the linear movement portion may linearly move the gripping member in a direction intersecting the conveyance direction of the conveying path. In this case, the rotational movement of the gripping member by the rotational movement portion and the linear movement of the gripping member by the linear movement portion are appropriately performed together. This makes it easier and smoother to move the gripping member horizontally to a position close to a circumferential edge of the plate and to remove the plate gripped by the gripping member horizontally from the container. Furthermore, the time required from start to completion of removing the plate (hereinafter, referred to as a "plate collection time") is likely to be reduced as compared to a situation where the plate is removed using only one of the linear movement portion and the rotational movement portion. Accordingly, it is possible to easily remove the plate.

In the present disclosure, a method is proposed in which the gripping member is linearly moved by the linear movement portion in a direction perpendicular to the conveyance direction of the conveying path. However, the linear movement portion can also linearly move the gripping member in a direction obliquely intersecting (i.e., not 90 degrees) the conveyance direction of the conveying path.

In the removing step, the control unit may execute a parallel operation while the circumferential edge of the plate is gripped by the gripping member. In the parallel operation, an operation of moving the gripping member in a direction away from the conveying path by the linear movement portion and an operation of rotating the gripping member by the rotational movement portion are performed in parallel (i.e., together). In this case, the plate collection time required from start to completion of removing the plate can be reduced more easily as compared to a situation where one of the linear movement portion and the rotational movement portion starts moving the gripping unit, and then the other starts moving the gripping unit (for example, when performing a stepwise operation, as will be described later). Accordingly, it is possible to easily remove the plate.

The control unit may further execute a removal determination step of determining whether to remove a plate from each of containers that are conveyed on the conveying path. When the control unit determines that plates are to be removed consecutively from two containers that are conveyed in a row on the conveying path (i.e., when both adjacent containers are target containers from which plates are to be removed), the parallel operation may be performed at least for the plate to be removed from the container (i.e., the following container) downstream of the preceding container (i.e., the container from which the plate is to be removed first) in the conveyance direction. As described above, the plate collection time can be reduced by executing the parallel operation. This makes it easier to remove the plate smoothly, even when plates are successively removed from multiple containers that are being conveyed in a row on the conveying path.

In addition, when the control unit successively removes plates from three or more containers that are conveyed in a row, two adjacent containers of the plates may be treated as a pair (for example, a pair of the first and second containers, a pair of second and third containers, a pair of third and fourth containers, etc.). Then, for each pair, the parallel operation may be performed on the following container in the pair that is positioned downstream of the preceding container in the pair in the conveyance direction. In this case, the plate picking-up device can smoothly and consecutively remove plates from three or more containers that are being conveyed in a row.

In addition, the control unit may perform the parallel operation when a plate is removed from a target container that is positioned downstream of a target preceding container in the conveyance direction when a first distance between the two adjacent target containers on the conveying path is less than or equal to a threshold value. As a result, plates can be smoothly and consecutively removed from the two containers that are conveyed in a row. In addition, when the first distance is greater than the threshold value, the control unit may execute a stepwise operation, which will be described later, when a plate is removed from a following target container that is positioned downstream of a preceding target container in the conveyance direction.

During the removal determination step, a method for determining whether a plate should be removed from each of containers can be appropriately selected. For example, in the present disclosure, an identifier (e.g., a QR code (registered trademark), a barcode, etc.) for identifying each container is provided on each of the containers. A database stores, in association with the identifier, a start time when each container starts housing a food or a drink (which may be a timing at which conveyance along the conveying path starts, for example). Furthermore, one or more reading units (e.g., an AI camera, etc.) that read the identifiers of the containers on the conveying path are disposed in the conveying path. The control unit obtains the start time associated with the identifier read by the reading unit. Then, the control unit may determine that the plate should be removed from the container if the elapsed time since the start time was acquired exceeds a threshold value. Accordingly, a determination as to whether to remove a plate from each of the containers can be appropriately made.

However, this determination method can be changed. For example, the start time of housing a food or a drink may be stored in an IC tag provided in each container. The control unit may determine whether to remove a plate from each container based on the elapsed time from the start time that was read from the IC tag.

During the removing step, the control unit may control the linear movement portion to linearly move the gripping member in a direction away from the conveying path while the circumferential edge of the plate is gripped by the gripping member. Thereafter, the control unit may execute the stepwise operation to rotate the gripping member by the rotational movement portion. In this case, the plate held by the gripping member is moved linearly away from the conveying path, and then rotated by the rotational movement portion. Therefore, it is possible to reduce the possibility that the plate rotated by the rotating portion comes into contact with the container from which the plate has been removed and with adjacent items (e.g., containers) that are downstream or upstream of the target container in the conveyance direction. Accordingly, it is possible to easily remove the plate.

In the present disclosure, an example method in the removing step is provided. In the method, the plate is moved away from the container by rotating the gripping member in a direction following the conveyance direction while the circumferential edge of the plate is gripped by the gripping member. In this case, as described above, the possibility that the plate held by the gripping member comes into contact with other items on the conveying path can be reduced. However, the plate picking-up device can also remove the plate from the container by using the rotational movement portion to rotate the gripping member in a direction against (i.e., opposite to) the conveyance direction. For example, when no other item is present around the target container or when the stepwise operation as described above is to be performed, the gripping member may be rotated in the direction opposite to the conveyance direction.

The control unit may further execute a removal determination step and a position acquisition step. At the removal determination step, the control unit determines whether a plate is to be removed from each container that is conveyed on the conveying path. At the position acquisition step, the control unit acquires a position of each of items (e.g., containers, etc.) that are conveyed on the conveying path. The control unit may perform the stepwise operation when the plate is removed from the target container if another item located immediately downstream of the target container is conveyed in the conveyance direction. As described above, by performing the stepwise operation, the possibility that the plate rotated by the rotational movement portion comes into contact with an item located downstream of the target container in the conveyance direction is reduced. Therefore, even if the item located downstream of the target container in the conveyance direction is present, the plate can be easily removed from the target container.

In addition, the plate picking-up device can selectively use, depending on the situation, a process of performing the parallel operation (i.e., a parallel operation process) when two plates are consecutively removed from two adjacent containers that are conveyed and a process of performing the stepwise operation (i.e., a stepwise operation) when an item is present adjacent to the target container on the downstream side of the target container.

Here, there may be a situation where the next target container is present on the upstream side of the specific target container, and another item is present on the downstream side of the specific target container. In this case, when a plate is removed from the specific target container, either the parallel operation process or the stepwise operation process may be executed. For example, the control unit may prioritize in removing plates appropriately from two adjacent target containers. In other words, when two target containers are conveyed in a row, the control unit may always execute the parallel operation process on the specific target container that is a downstream-side target container among the two adjacent target containers.

The control unit may also execute the parallel operation on the specific target container. However, this is limited to the case where the first distance between the specific target container and the adjacent target container located upstream of the specific target container is equal to or less than a threshold value. As a result, plates can be smoothly and consecutively removed from the two containers that are conveyed in a row. Furthermore, even if two target containers are conveyed in a row, if the first distance is greater than the threshold value, the plates can be properly removed from the two target containers consecutively without executing the parallel operation. Thus, the control unit may perform the stepwise operation when the first distance is greater than the threshold value and when the two target containers are not consecutively arranged (i.e., when the target container and a non-target container are arranged). As a result, the possibility that the plate rotated by the rotational movement portion comes into contact with an item or the like adjacent to the target container on the downstream side of the target container in the conveyance direction can be reduced.

In the present disclosure, the plate picking-up device including both the rotational movement portion and the linear movement portion will be exemplified. However, the plate picking-up device includes only one of the rotational movement portion and the linear movement portion. Even in this case, the plate is automatically and appropriately removed from the container.

At the gripping step, the control unit may control the linear movement portion to linearly move the gripping member in a direction toward the conveying path. The gripping member may then be controlled to grip a circumferential edge of the plate. In this case, the gripping member linearly approaches the circumferential edge of the plate. Therefore, when the gripping member approaches the circumferential edge of the plate, the possibility that the gripping member or other members come into contact with other members (e.g., the lid of a container) of the container is appropriately reduced. However, the gripping member may be rotated by the rotational movement portion in a direction toward the plate. Alternatively, the gripping member of the plate picking-up device may stay at a position where the gripping member can grip the circumferential edge of the plate.

The control unit may further execute a collecting step of guiding the plate to a collecting member that collects the plate by releasing the grip of the circumferential edge of the plate by the gripping member during or after completion of the removing step. In this case, the plate removed from the container is appropriately guided to the collecting member.

At the collecting step, the control unit may throw the plate into the collecting member by releasing the grip of the circumferential edge of the plate by the gripping member while the gripping member is being moved horizontally by the moving member at the removing step. In this case, the time required from start of removing the plate to complete of collecting the plate is appropriately reduced as compared to a method in which the gripping member releases the grip of the plate after the movement of the gripping member was stopped. Therefore, for example, even when plates are to be removed successively from a number of containers that are conveyed in a row on the conveying path, the plates can be removed more smoothly.

The plate picking-up device may further include a guide cover. The guide cover is provided at a position to which the plate that has been released from the gripping member is thrown during the collecting step. As a result, the guide cover receives the plate and guides the plate to the collecting member. In this case, at the collecting step, the plate can be guided to the collecting member by the guide cover after the grip of the plate by the gripping member was released. For example, even when the plate is thrown by the picking-up unit, the plate that comes into contact with the guide cover is appropriately guided to the collecting member. Therefore, the plate can be appropriately collected with a simple configuration.

A position guide may be provided in the conveying path at least at a position adjacent to the picking-up unit. The container conveyed on the conveying path comes into contact with the position guide. As a result, the position guide adjusts the position of the container in a direction intersecting the conveyance direction of the conveying path. At the gripping step, the gripping member may be moved horizontally relative to the plate in the container while the position of the container is guided by the position guide in a direction intersecting the conveyance direction of the conveying path. Therefore, the distance between the plate picking-up device and the target container is further fixed. Accordingly, the plate picking-up device can move the gripping member to a position close to the circumferential edge of the plate with even greater accuracy during the gripping step. This makes it easier to remove the plate from the target container.

The plate picking-up device may be provided with a lid opening member in the conveying path at a position upstream of the picking-up unit in the conveyance direction. The lid opening member opens the lid by pushing up the plate on the plate setting portion of the container in cooperation with the open/close mechanism. In this case, the lid of the container is automatically opened by the lid opening member. This makes it easier to properly remove a plate from the container with the lid being open.

A pair of upper and lower gripping pieces of the gripping member that clamp the circumferential edge of the plate in a vertical direction may be angled with respect to the horizontal direction such that the angle at which the pair of two gripping pieces extends has a value close to an angle of the plate that is angled by the lid opening member pushing-up the plate. In this case, when the gripping member is moved to a position close to the circumferential edge of the plate by the moving member, the angle at which the pair of gripping pieces extend has a value close to the angle at which the plate is tilted. Therefore, the angle of the plate is less likely to change when the circumferential edge of the plate is gripped by the gripping member. This makes it easier to hold the plate in a more stable state. In addition, the possibility that the plate comes into contact with other members (such as the lid) is reduced.

A sensor may be provided in the conveying path at a position between the picking-up unit and the lid opening member to detect an open/closed state of the lid of the container and detect whether a plate is present in the container. The control unit may further execute a removal determination step and an opening step. At the removal determination step, the control unit determines whether a plate is to be removed from each container that is conveyed on the conveying path. At the opening step, the control unit controls the lid opening member to open the lid. That is, when the container from which a plate is removed is conveyed to the lid opening member by the conveying path, the lid is opened by the lid opening member. The control unit may perform a gripping step and a removing step when a container for which the sensor has detected that the lid is open and that a plate is placed thereon is conveyed to a picking-up position where the plate can be gripped by the gripping member.

In this case, the lid of the container from which a plate is determined to be removed is automatically opened by the lid opening member. The lid is then opened. When the container on which the plate is placed is conveyed to the picking-up position where the plate can be gripped, the plate is automatically removed. Thus, the target plate is automatically and appropriately removed by the plate picking-up device.

The plate picking-up device may further include a connecting member that connects the sensor to the picking-up unit to fix their relative positions. In this case, the distance between the sensor and the picking-up unit is fixed to have a constant value. Therefore, if the conveying speed of the container along the conveying path is known, the time from a timing at which the container is detected by the sensor to a timing at which the container arrives at the picking-up position for the picking-up unit can be accurately calculated. Therefore, the plate in the container that has arrived at the picking-up position can be removed by the picking-up unit in a timely manner.

The gripping member may include an upper gripping piece that contacts the circumferential edge of the plate from an upper side of the plate and a lower gripping piece that contacts the circumferential edge of the plate from a lower side of the plate. At the gripping step, when the gripping member is moved horizontally to a position close to the circumferential edge of the plate in the container, the upper gripping piece may be positioned above the circumferential edge of the plate and the lower gripping piece may be positioned below the circumferential edge of the plate. The circumferential edge of the plate may be gripped by the upper gripping piece and the lower gripping piece so that the plate may be lifted by the gripping member. In this case, the circumferential edge of the plate is simply gripped by the gripping member, and the plate is lifted slightly from the container. Therefore, there is no need to provide a separate mechanism for lifting or lowering the gripping member. Therefore, when the plate is subsequently moved horizontally, the plate is less likely to interfere with the setting holder on which the container is placed. This makes it easier to properly remove plates with a simple configuration.

In the present disclosure, the plate picking-up device that removes plates from containers on the conveying path will be mainly exemplified. However, at least one of the techniques exemplified in this disclosure may also be used in an item processing device that moves items conveyed on the conveying path. For example, a plate placed directly on the conveying path without being housed in a container, or the container itself placed on the conveying path may be moved by the item processing device. In addition, advertising materials, seasonings, performance materials, etc. that can be conveyed along the conveying path may be moved by the conveyed items processing device.

In this case, the item processing device may be also described as follows.

The item processing device moves the item that can be conveyed on the conveying path between a space on the conveying path along a predetermined conveyance direction and a space outside of the conveying path. The item processing device includes a gripping member that grips a portion of a conveyed item by clamping the item, a moving member that moves the gripping member in a horizontal direction, and a control unit. A unit including the gripping member and the moving member is disposed adjacent to the conveying path. Then, the moving member is controlled to move the gripping member horizontally toward the conveyed item. The item processing device then performs a gripping step of controlling the gripping member to grip the conveyed item and a moving step of controlling the moving member to move the conveyed item in a horizontal direction while the conveyed item is gripped by the gripping member.

In addition, at least one of the techniques exemplified in this disclosure can also be used in an item processing device that is capable of performing processing other than movement (e.g., at least one of cleaning, disinfection, and sterilization) on conveyed items (which may be the conveying path itself) conveyed along the conveying path. For example, the item processing device may be used to process at least one of the container, the plate placed in the container, the plate placed directly on the conveying path without being contained in the container, and the conveying path itself.

In this case, the item processing device may be also described as follows.

The item processing device may be a device that processes a processing target which is at least one of the conveying path that conveys items in a predetermined conveyance direction and the conveyed items on the conveying path. The item processing device further includes a processing member for processing the processing target, a moving member for moving the processing member at least in a horizontal direction, and a control unit. A unit including the processing member and the moving member is installed adjacent to the conveying path. The moving member is controlled to horizontally move the processing member to the processing target. The item processing device performs a processing step of processing the processing target by the processing member and a separating step of separating the processing member away from the processing target.

In addition, an acting element such as a brush, sponge, cloth, or sheet used for cleaning, disinfection, sterilization, or the like may be attached or fixed to the processing member. The processing member may include a driving unit (e.g., an actuator) that performs at least one of rotational driving, swinging driving, and reciprocating driving for the acting element. The driving method for the moving member at the separating step may be the same as the driving method at the separating step exemplified in the plate picking-up device in the present disclosure. The moving member may be at least any one of a plurality of configurations provided in the moving member of the plate picking-up device in the present disclosure. In this case, the operation of moving the processing member toward the processing target and the operation of moving the processing member away from the processing target are performed by horizontal movement. Therefore, the processing member is less likely to come into contact with conveyed items, etc. other than the processing target to be processed. This makes it easier for the processing target to be processed appropriately. In addition, the item processing device can appropriately be at least any of the various configurations and processes of the plate picking-up device disclosed herein.

Embodiment (Schematic Configuration of a Restaurant Conveying System)

Hereinafter, a typical embodiment of the present disclosure will be described with reference to drawings. First, with reference to FIG. 1, an example of a restaurant conveying system 100 in which a plate picking-up device 1 according to the present embodiment is installed will be described. As shown in FIG. 1, the restaurant conveying system 100 of the present embodiment includes a conveying device 101. The conveying device 101 conveys items (containers 10 (see FIGS. 2 and 3), advertising materials, etc.) on a conveying path 102 along a predetermined conveyance direction (the direction by the arrows in FIG. 1). The route (a conveying route) of the conveying path 102 shown in FIG. 1 is a circulation route that circulates between a kitchen area K and a dining area G. The items on the conveying path 102 in the kitchen area K are conveyed sequentially along the conveying route to pass by each table 104 (a dining space) arranged in the dining area G. Any items that have not been taken out by customers in the dining area G are returned to the kitchen area K. A crescent chain that conveys a plurality of plates along a path may be used as the conveying path 102.

A self-order device, which is a touch-panel display, is provided at each table 104 in the dining area G. A customer can order a desired food or drink by operating the self-order device. The plate picking-up device 1 is installed in the conveying path 102 in the kitchen area K for removing plates from the containers 10 that are being conveyed on the conveying path 102. The plate picking-up device 1 will be described in detail later. In addition, the kitchen area K is provided with an order display device 107 which is a touch panel display. Staffs check ordered items displayed on the order display device 107. The staffs then place the ordered items on the conveying path 102.

(Container)

Figure 2:
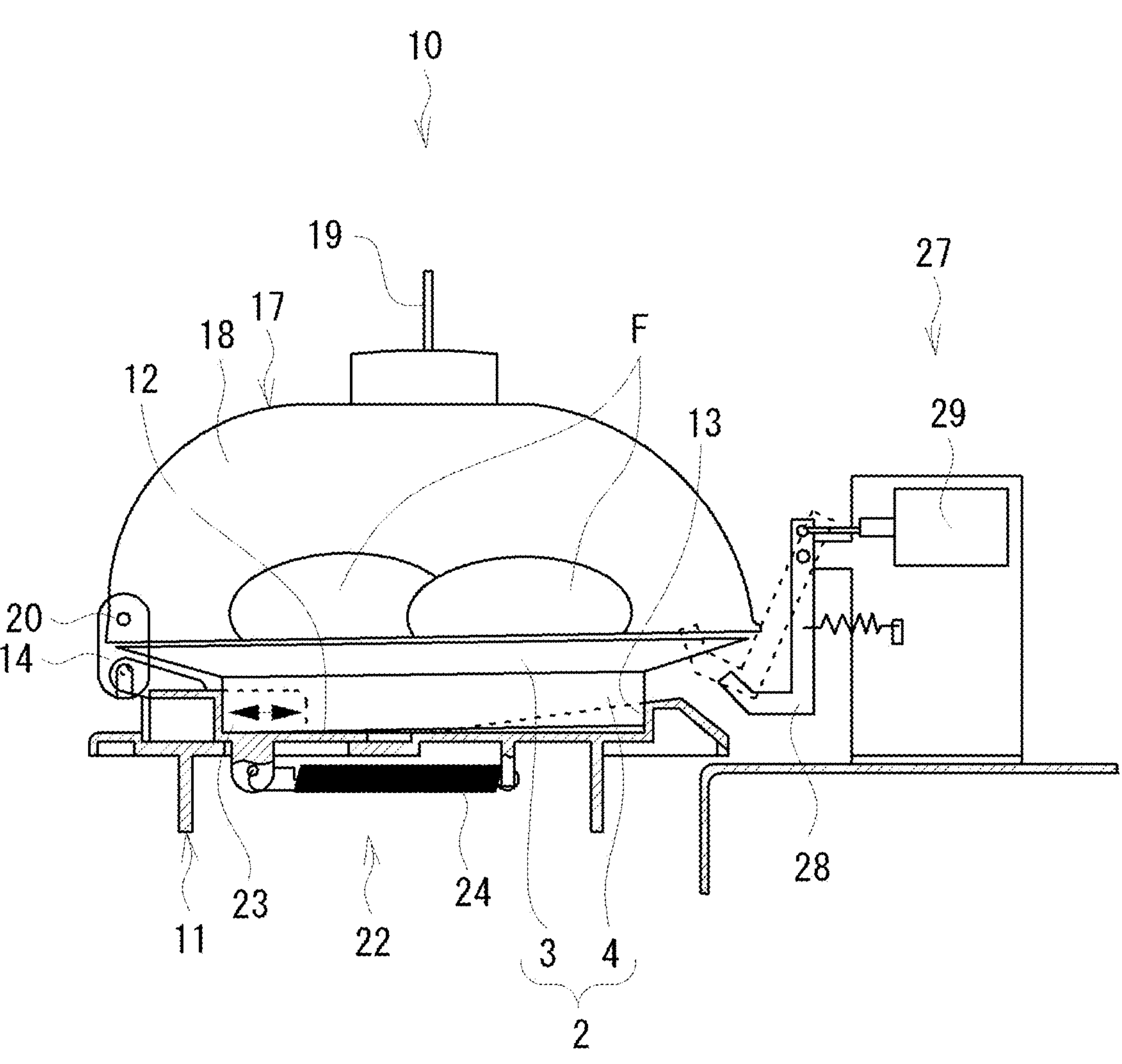
FIG. 2 is a vertical cross-sectional view of a container with a plate being placed therein and a lid being closed, and a lid opening member.
Figure 3:
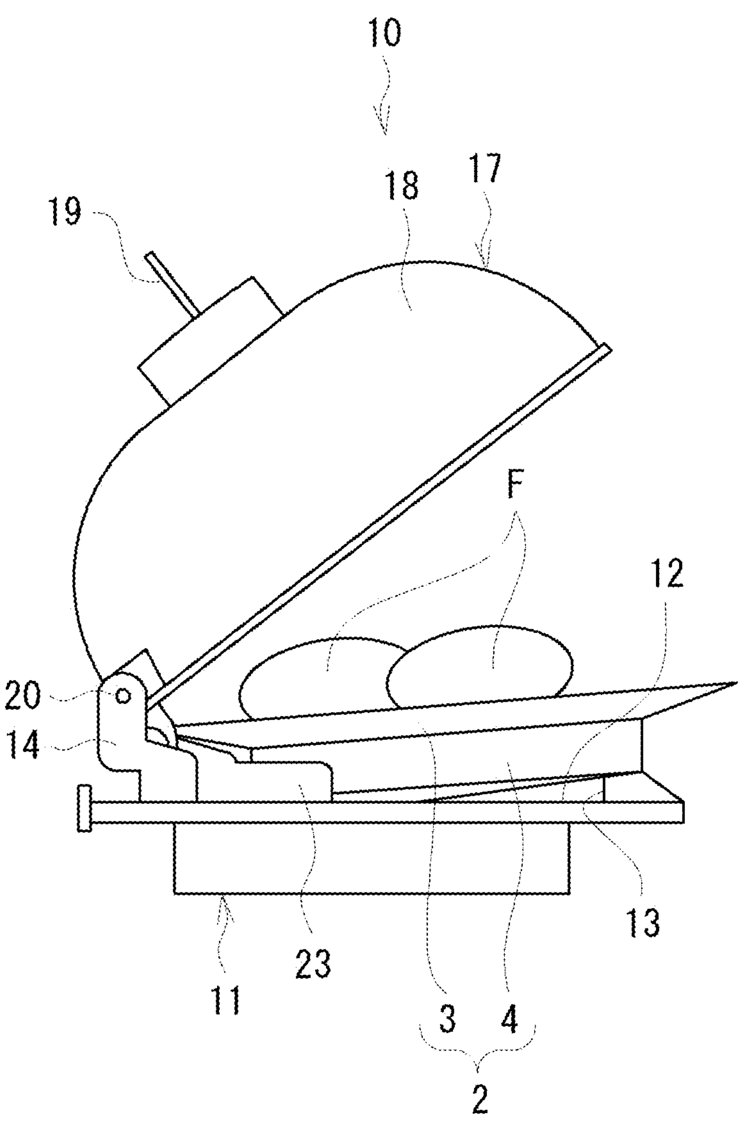
FIG. 3 is a side view of the container with the lid being opened by the lid opening member.

The container 10 conveyed by the conveying device 101 (the conveying path 102) in the present embodiment will be described with reference to FIGS. 2 and 3. FIG. 2 is a vertical cross-section viewed from one side of a lid opening member 27 and the container 10 in which a plate 2 is placed therein and the lid 17 is closed. FIG. 3 is a side view of the container 10 where the lid 17 is opened by the lid opening member 27. As shown in FIGS. 2 and 3, the container 10 houses the plate 2 on which a food and/or drink are placed. Accordingly, the container 10 is capable of housing the plate 2 therein by closing the lid 17. In addition, the lid 17 of the container 10 is opened (in other words, an open/close mechanism opens the lid 17) when the plate 2 is removed from the container 10. The plate (a tableware) 2 includes a plate body 3 which is circular-shaped in plan view on which a food/drink F (hereinafter, simply referred to as "food F") is placed, and a cylindrical base 4 which protrudes downward from the plate body 3 at a position slightly inside of an outer circumferential edge of the plate body 3. In other words, the outer circumferential edge of the plate body 3 extends outward beyond the base 4 to have a flange-like shape.

As shown in FIG. 2, the container 10 includes a setting holder 11, the lid 17, and the open/close mechanism 22. The setting holder 11 has a plate setting portion 12 at the center of an upper surface of the setting holder 11 on which the plate 2 is set (placed). A stopper 13 is provided on the upper surface of the setting holder 11 in front of the plate setting portion 12 (i.e., on the right side in FIGS. 2 and 3). An outer edge of the lower end of the base 4 of the plate 2 is engageable with the stopper 13. The stopper 13 protrudes upward from the top surface of the plate setting portion 12. The inner circumferential surface of the stopper 13 (i.e., the surface facing in the left side direction in FIGS. 2 and 3) is formed in a curved shape in a plan view to fit the cylindrical shape of the base 4 of the plate 2. A pair of support pieces 14 extending upward are provided on the left and right sides of the rear end portion (i.e., the left end portion in FIGS. 2 and 3) of the setting holder 11. The support pieces 14 support the lid 17 while allowing the lid 17 to open and close.

The lid 17 includes a dome-shaped (i.e., hemispherical) lid body 18 that has an opening on a lower side. The lid body 18 is made of a transparent synthetic resin. Therefore, even when the lid 17 is closed, a customer can see the inside of the container 10. A pair of arms (not shown) extending downward are provided on the left and right sides of the rear end portion of the lid 18 (the left end portion in FIGS. 2 and 3). A shaft 20 is disposed in the arms. The shaft 20 of the arms is inserted into shaft holes formed in the support pieces 14 of the setting holder 11. As a result, the lid 17 is attached to the setting holder 11 to be openable and closable (i.e., the lid 17 is able to swing up and down) using the axis 20 as the axis of rotation. In addition, an identifier 19 (e.g., a QR code (registered trademark), a barcode, etc.) for identifying each container 10 is attached to the upper portion (i.e., the top portion) of the lid 18.

As shown in FIG. 2, the open/close mechanism 22 is provided on the setting holder 11. The open/close mechanism 22 includes an operating portion 23 and a biasing portion 24 (a coil spring in this embodiment). The operating portion 23 is provided to be movable backward and forward along a guide portion formed on the setting holder 11 in a front-rear direction (the left-right direction in FIGS. 2 and 3). One end (the right end in FIG. 2) of the biasing portion 24 is fixed to the setting holder 11, and the other end (the left end in FIG. 2) is fixed to the operating portion 23. As a result, a biasing force in the front direction is applied to the operating portion 23 by the biasing portion 24. The operating portion 23 is connected at a position below the axis of an arm piece (not shown) of the lid 17. When the operating portion 23 moves forward by the biasing force of the biasing portion 24, the arm piece of the lid 17 rotates, and the lid 17 opens. On the other hand, when the operating portion 23 is moved backward against the biasing force of the biasing portion 24, the lid 17 is closed.

A chef places the plate 2 on the plate setting portion 12 and pushes the plate 2 backward. As a result, the operating portion 23 is pushed by the plate 2 and moves backward. As a result, the lid 17 is closed. Thereafter, the plate 2 is completely placed on the plate setting portion 12. The base 4 of the plate 2 is then interposed and fixed between the stopper 13 and the operating portion 23 of the setting holder 11. Thus, with the food placed on the plate 2 covered by the lid 17 (the lid body 18), the posture of the lid 17 is fixed. On the other hand, when a customer or the like lifts the front side (the left side in FIGS. 2 and 3) of the plate 2 upward, contact between the base 4 of the plate 2 and the stopper 13 is released. As a result, the force of the biasing portion 24 causes the operating portion 23 to push the base 4 of the plate 2 forward, and thus the lid 17 opens. The configuration of the container 10 disclosed in Japanese Patent No. 5416288 and Japanese Patent Publication No. 2020-168123, etc. may be used.

(Lid Opening Member)

The lid opening member 27 of the plate picking-up device (the plate picking-up system) 1 will be described with reference to FIG. 2. The lid opening member 27 includes a plate pushing-up portion 28 and an actuator 29. The plate pushing-up portion 28 rotates about an axis extending in a horizontal direction. As a result, the plate pushing-up portion 28 raises the front lower portion of the plate body 3 of the plate 2. As a result, the engagement between the base 4 of the plate 2 and the stopper 13 is released. Then, due to the biasing force of the biasing portion 24, the operating portion 23 pushes the base 4 of the plate 2 forward, and the lid 17 opens. In other words, when the lid opening member 27 operates, the lid 17 is automatically opened by the open/close mechanism 22 of the container 10. As shown in FIG. 3, the front lower portion of the plate 2 is laid on the stopper 13. Therefore, the plate 2 slightly tilts with respect to the horizontal plane. The actuator 29 (such as a motor or a solenoid) drives the plate pushing-up portion 28.

(Plate Picking-Up Device)

Figure 4:
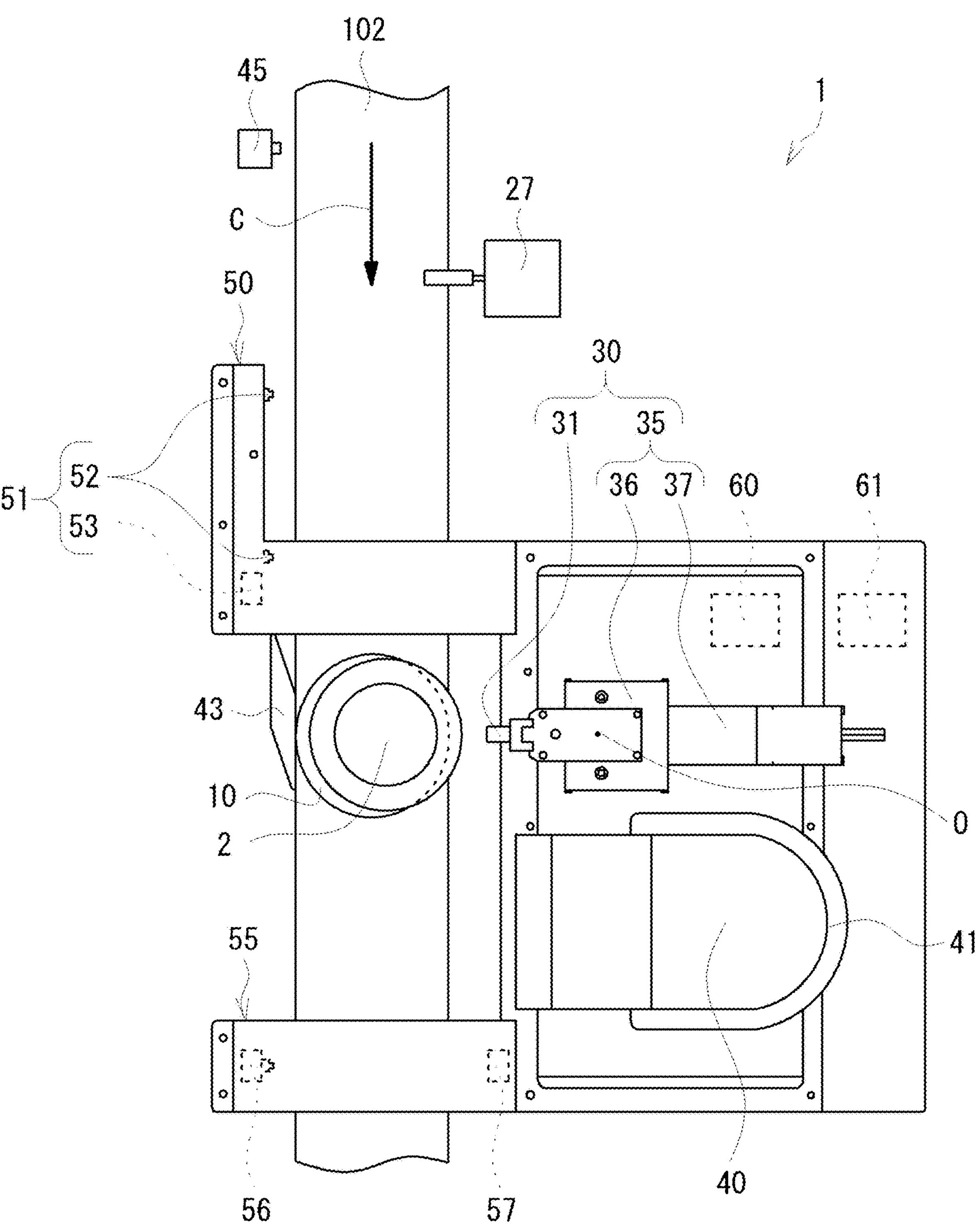
FIG. 4 is a plan view of the plate picking-up device before a gripping member grips the plate.
Figure 5:
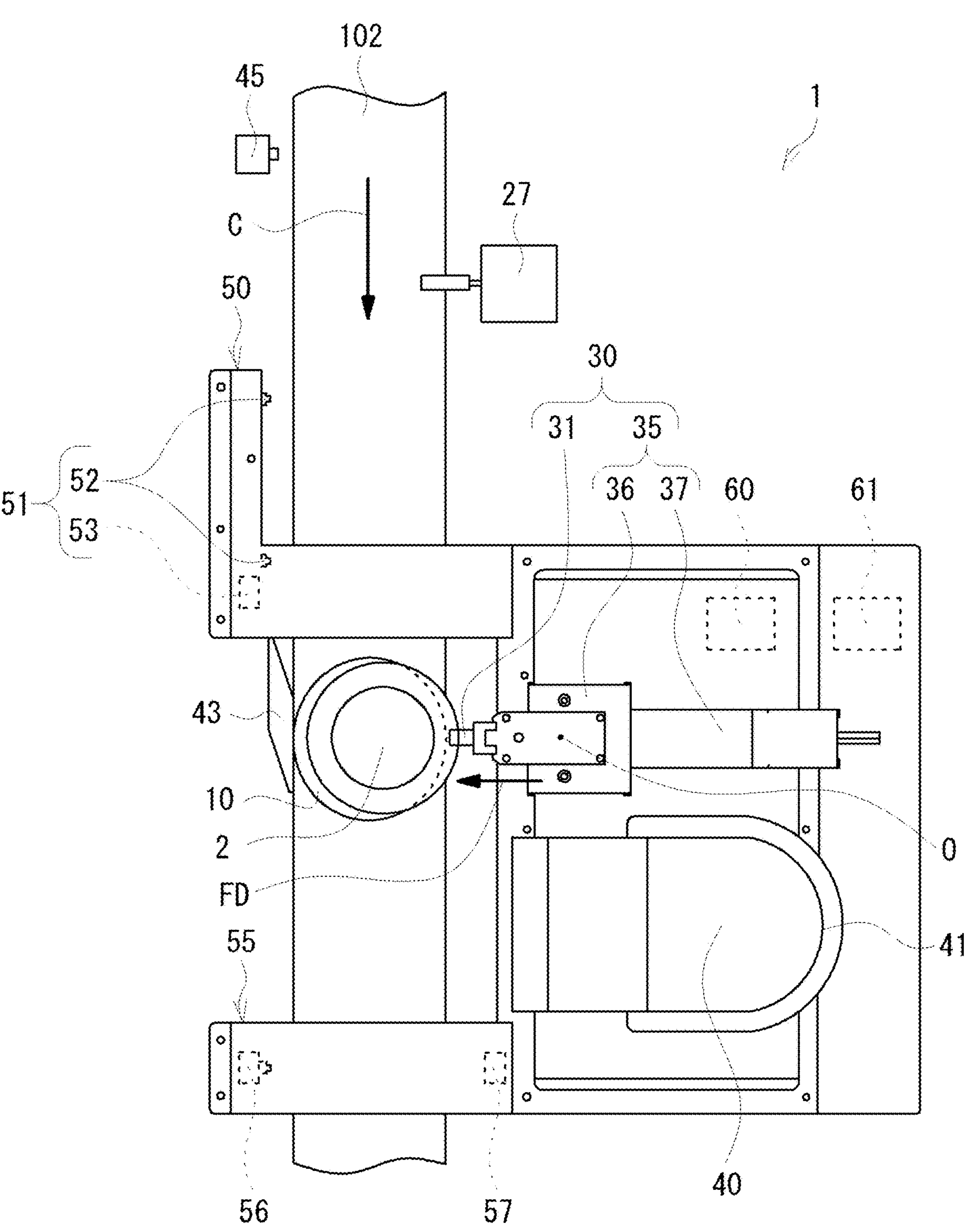
FIG. 5 is a plan view of the plate picking-up device when the gripping member grips the plate.
Figure 6:
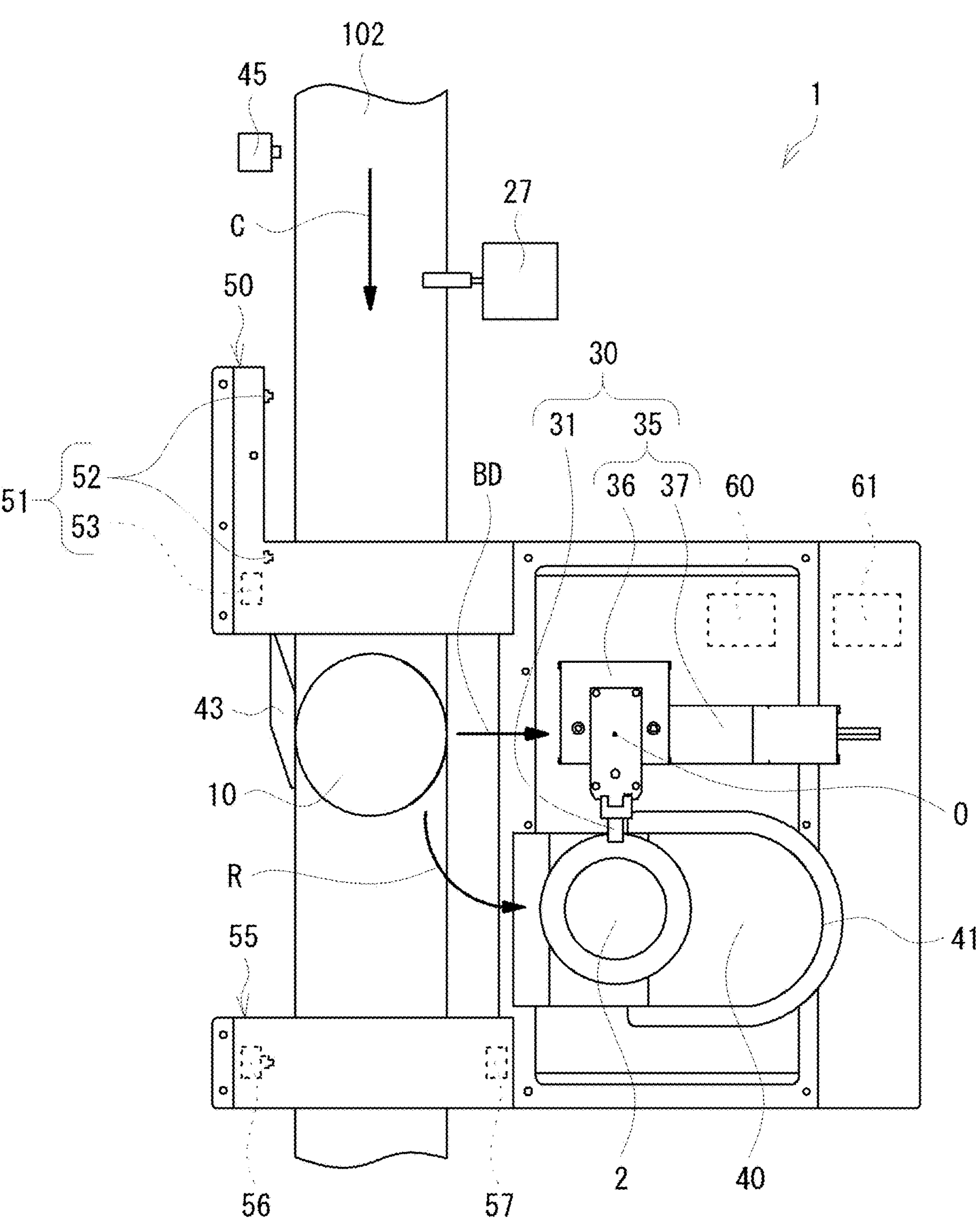
FIG. 6 is a plan view of the plate picking-up device when the plate gripped by the gripping member is moved to a position above a collecting member by a moving member.

The plate picking-up device 1 according to the present embodiment will be described with reference to FIGS. 4 to 8. The lid 17 of the container 10 is not illustrated in FIGS. 4 to 6 for understanding purposes. As shown in FIGS. 4 to 6, the plate picking-up device 1 automatically removes (picks up) the plate 2 from the container 10 that is conveyed along the conveyance direction C (see FIGS. 4 to 6) on the conveying path 102 of the conveying device 101. The plate picking-up device 1 of the present embodiment includes a gripping member 31, a moving member 35, and a control unit 60. In the present embodiment, a mechanism including the gripping member 31 and the moving member 35 is referred to as a picking-up unit 30. The picking-up unit 30 is disposed adjacent to the conveying path 102.

The gripping member 31 grips a part of a circumferential edge of the plate 2 (in the present embodiment, a circumferential edge of the plate body 3 (see FIGS. 3 and 4) of the plate 2) by clamping a part of the edge in a vertical direction. The gripping member 31 will be described in detail later. The moving member 35 moves the gripping member 31 in the horizontal direction. In the present embodiment, the moving member 35 includes a rotational movement portion 36 and a linear movement portion 37.

The rotational movement portion 36 rotates and moves the gripping member 31 in the horizontal direction about a rotation axis O that extends in the vertical direction (i.e., an up-and-down direction). Using the rotational movement portion 36 brings the following advantages as compared with the case where the gripping member 31 is moved only linearly. That is, there is no need to install a collecting member 40 (which will be described in detail later) for collecting the plate 2 removed from the container 10 between the picking-up unit 30 of the plate picking-up device 1 and the conveying path 102 (i.e., the container 10 on the conveying path 102). As a result, freedom to utilize a space in the restaurant can be increased.

Figure 7:
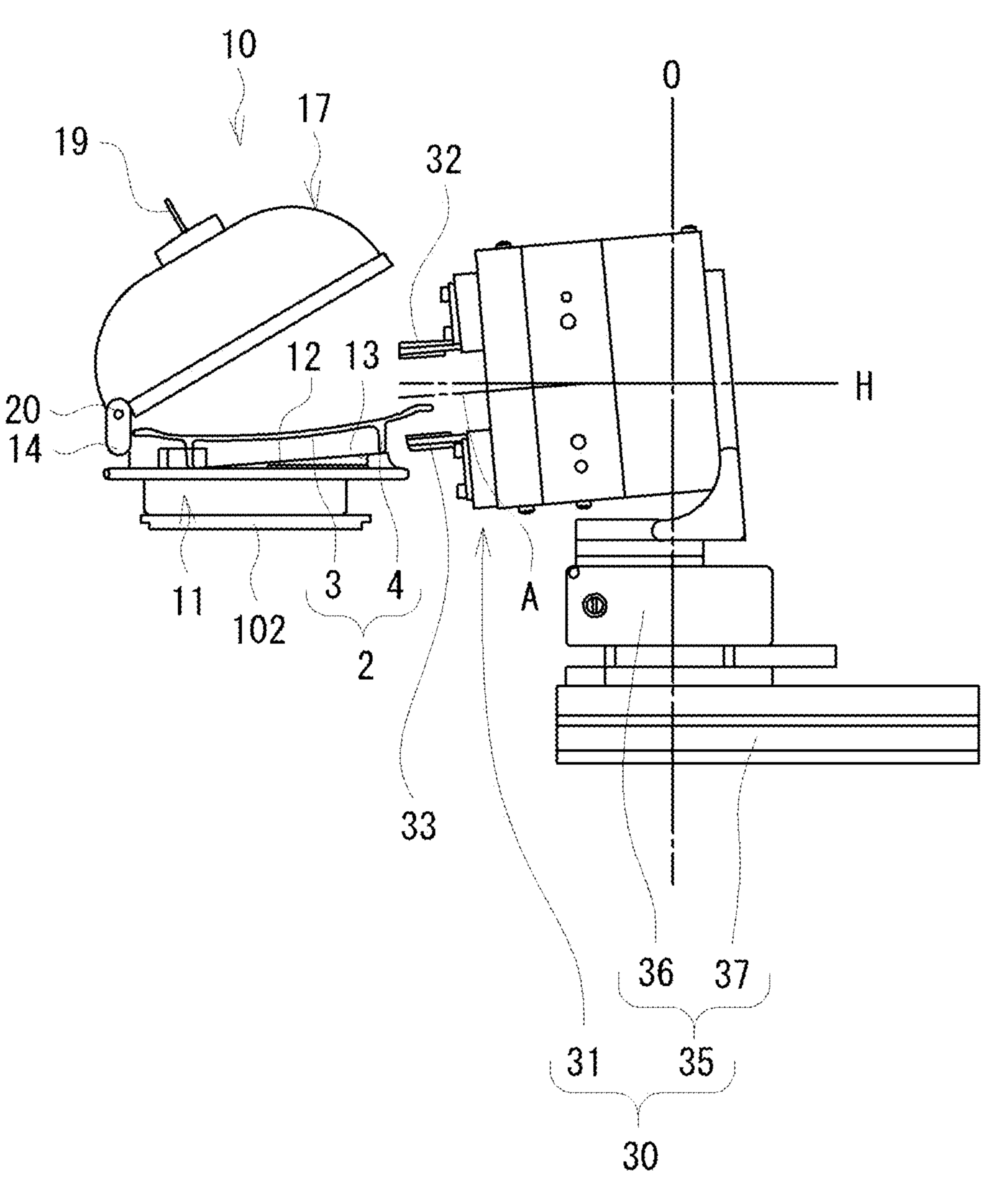
FIG. 7 is a side view of a picking-up unit, the container, and the plate immediately before the gripping member grips the plate.
Figure 8:
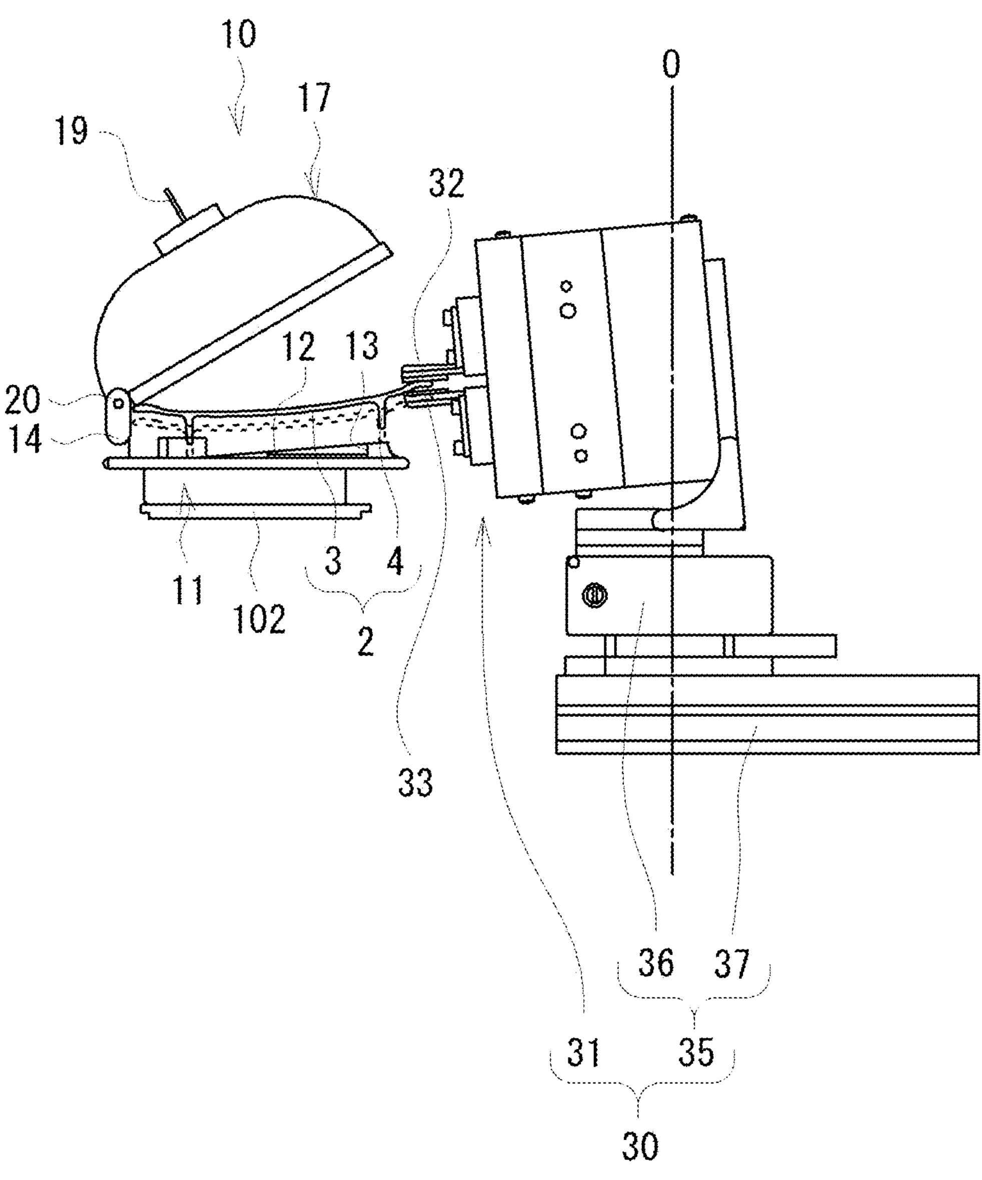
FIG. 8 is a side view of the picking-up unit, the container, and the plate immediately after the plate was gripped by the gripping member.

As shown in FIGS. 7 and 8, the rotational movement portion 36 of the present embodiment rotatably supports the gripping member 31 with an upper part of the portion 36. An actuator (e.g., a motor or the like) for rotating the gripping member 31 is disposed in the rotation movement portion 36. In the present embodiment, the rotational movement portion 36 rotates the gripping member 31 back and forth within a predetermined angular range centered on the rotational axis O extending in the vertical direction (for example, within a range of approximately 90 degrees about the rotational axis O). As a result, both the operation of moving the gripping member 31 to approach the plate 2 and the operation of moving the plate 2 gripped by the gripping member 31 away from the container 10 are performed appropriately.

As shown in FIGS. 5 and 6, the rotational movement portion 36 of the present embodiment rotates and moves the gripping member 31 and the plate 2 in the same rotational direction R (i.e., the counterclockwise direction from the 9 o'clock angle in FIG. 6) as the predetermined conveyance direction C of the conveying path 102 (i.e., downward in FIGS. 5 and 6) while the circumferential edge of the plate 2 is gripped by the gripping member 31. As a result, the rotational movement portion 36 moves the plate 2 away from the container 10. Along the conveying path 102, other items (e.g., other containers 10, etc.) are often present and conveyed on at least one of the upstream side (i.e., an upper side in FIGS. 5 and 6) and the downstream side (a lower side in FIGS. 5 and 6) of the container 10, from which the plate 2 is to be removed (hereinafter, referred to as a "target container"), in the conveyance direction C. After the plate 2 is gripped by the gripping member 31, the item located upstream of the target container in the conveyance direction C moves in a direction for approaching the gripped plate 2.

Here, it is assumed that the rotational movement portion 36 rotates and moves the gripping member 31 in the direction opposite to the conveyance direction C. In this case, the item located upstream of the target container in the conveyance direction C is likely to come into contact with the plate 2 held by the gripping member 31. On the other hand, an item downstream of the target container in the conveyance direction C move in a direction away from the gripped plate 2 after the plate 2 was gripped by the gripping member 31. Therefore, the rotational movement portion 36 rotates and moves the gripping member 31 in the rotational direction R following (or along) the conveyance direction C. Accordingly, the plate 2 held by the gripping member 31 is less likely to come into contact with other items on the conveying path 102. Moreover, the plate 2 can be smoothly removed from the target container.

The linear movement portion 37 is capable of linearly moving the gripping member 31 in a direction for changing the distance between the gripping member 31 and the conveying path 102 (in the present embodiment, a direction intersecting the conveyance direction C of the conveying path 102). As one example, the linear movement portion 37 of the present embodiment linearly moves the rotational movement portion 36 in a direction for changing the distance between the rotational movement portion 36 i.e., the rotation axis O of the rotational movement portion 36) and the conveying path 102 (in the present embodiment, a direction intersecting perpendicularly to the conveyance direction C). As a result, the gripping member 31 can be moved. The rotational movement of the gripping member 31 by the rotational movement portion 36 and the linear movement of the gripping member 31 by the linear movement portion 37 are appropriately performed together. As a result, the operation of horizontally moving the gripping member 31 toward the circumferential edge of the plate 2 and the operation of horizontally removing the gripping member 31 that grips the plate 2 from the container 10 can be performed more smoothly. In addition, the time required to collect the plate 2 can be reduced.

As shown in FIGS. 7 and 8, the linear movement portion 37 of the present embodiment supports the rotational movement portion 36 with an upper portion of the portion 37 while allowing the rotational movement portion 36 to linearly move. The linear movement portion 37 is provided with a guide for guiding the movement direction of the rotational movement portion 36 in a linear direction, and an actuator (for example, a motor or a solenoid) for linearly moving the rotational movement portion 36. The linear movement portion 37 reciprocates the rotational movement portion 36 within a predetermined linear movable range. That is, the linear movement portion 37 moves the rotational movement portion 36 in a forward direction FD shown in FIG. 5. Then, the linear movement portion 37 moves the rotational movement portion 36 in a backward direction BD shown in FIG. 6. By moving the rotational movement portion 36 back and forth, the operation of moving the gripping member 31 to approach the plate 2 and the operation of moving the plate gripped by the gripping member 31 away from the container 10 are both appropriately performed. The configurations of the rotational movement portion 36 and the linear movement portion 37 may be changed as appropriate. For example, the rotational movement portion may rotatably hold the linear movement portion. The linear movement portion may move in a linear direction relative to the rotational movement portion. Even in this case, both the rotational movement and the linear movement of the gripping member 31 can be appropriately performed.

As shown in FIGS. 4 to 6, the plate picking-up device 1 (in the present embodiment, the picking-up unit 30 of the plate picking-up device 1) is provided with the collecting member 40 that collects plates. The collecting member 40 in the present embodiment is located lower than a gripping point at which the plate 2 is gripped by the gripping member 31. The collecting member 40 guides the collected plate 2 downward to a predetermined destination position. In the present embodiment, the collecting member 40 is provided at a position within the rotational range of the rotational movement portion 36. More specifically, the collecting member 40 is located at an end of the rotational range opposite to an end of the rotational range close to the conveying path 102 (in other words, located at a position toward which the plates 2 are moved by the gripping member 31 and the moving member 35). Therefore, as described above, the space between the picking-up unit 30 and the conveying path 102 can be secured.

A guide cover 41 is provided at a position toward which the plates 2 are thrown after the gripping member 31 released the plates 2. After the plates 2 were released from the gripping member 31 (in other words, the gripping member 31 threw away the plates 2), the plates 2 come into contact with the guide cover 41. As a result, the guide cover 41 receives and guides the plates 2 to the collecting member 40. The guide cover 41 protrudes from the rear portion (i.e., the right side in FIGS. 4 to 6) of the collecting member 40 in an upper direction along a direction in which the plates move. The guide cover 41 of the present embodiment has an arc-shape in plan view to cover the upper rear portion of the collecting member 40. By providing the guide cover 41, the plate 2 is appropriately guided to the collecting member 40 even when the plate 2 is thrown forcefully by the gripping member 31.

As shown in FIGS. 4 to 6, the plate picking-up device 1 includes a position guide 43 adjacent to the picking-up unit 30 in the conveying path 102. In the present embodiment, the width of a portion of the conveying path 102 other than a portion where the position guide 43 is disposed (i.e., the width in the direction perpendicular to the conveyance direction C) is slightly greater than the width of the setting holder 11 of the container 10. Therefore, when the containers 10 are placed on the conveying path 102, the positions of the containers 10 may slightly differ with each other in the width direction on the conveying path 102. The position guide 43 comes into contact with the containers 10 conveyed on the conveying path 102 from at least one side of the container 10. As a result, the position guide 43 guides the containers 10 in the width direction on the conveying path 102. As a result, each of the positions of the containers 10 can be appropriately adjusted to have a particular distance between the picking-up unit 30 and each of the containers 10. The position guide 43 in the present embodiment contacts the containers 10 from one side of the conveying path 102 opposite to the side of the conveying path 102 on which the picking-up unit 30 is disposed. As a result, the picking-up unit 30 guides the containers 10 on the conveying path 102 toward the side on which the picking-up unit 30 is disposed. The gripping member 31 is moved horizontally relative to the container 10 (the plate 2) that is guided by the position guide 43. Therefore, the plate picking-up device 1 can move the gripping member 31 to a position close to the circumferential edge of the plate 2 with greater accuracy.

As shown in FIGS. 4 to 6, the plate picking-up device 1 includes the above-mentioned lid opening member 27 located upstream of the picking-up unit 30 in the conveyance direction C of the conveying path 30. Furthermore, the plate picking-up device 1 includes a sensor 51 on the conveying path 102 between the picking-up unit 30 and the lid opening member 27. The sensor 51 includes an item sensor 52 and a plate sensor 53. The item sensor 52 detects an item when the item conveyed on the conveying path 102 passes nearby. The control unit 60 obtains the position of the item that is conveyed along the conveying path 102 and passes nearby the plate picking-up device 1 based on the detection result by the item sensor 52. Furthermore, the item sensor 52 detects an open-closed state of the lid 17 of the container 10 that passes nearby the item sensor 52. The plate sensor 53 detects whether a plate 2 is present in the container 10 that is passing nearby the plate sensor 53. The item sensor 52 and the plate sensor 53 may be various devices such as an infrared sensor or a camera. In the present embodiment, a plurality of (two in this embodiment) item sensors 52 are provided at different positions. As a result, the accuracy of detecting an item and the accuracy of detecting the open-closed state of the lid 17 are both improved as compared to a situation where only one item sensor 52 is used. The number of item sensors may be one, or three or more.

The sensor 51 is fixed to a first connecting arch member (a connecting member) 50. The first connecting arch member 50 connects the sensor 51 to the picking-up unit 30. As a result, the first connecting arch member 50 fixes the relative positions between the sensor 51 and the picking-up unit 30. In other words, the first connecting arch member 50 having the sensor 51 is connected (fixed) to the picking-up unit 30. This causes the distance between the sensor 51 and the picking-up unit 30 to have a constant value. In the present embodiment, the conveying speed of the container 10 through the conveying path 102 is known in advance. Therefore, the time from a timing at which an item (e.g., a container 10 or a plate 2) is detected by the sensor 51 to a timing at which the item arrives at a picking-up position at which the item is picked up by the picking-up unit 30 (i.e., the position at which the plate 2 in the container 10 is gripped by the gripping member 31) can be accurately calculated. Thus, the plate 2 in the container 10 that has arrived at the picking-up position can be removed by the picking-up unit 30 at an appropriate timing.

The plate picking-up device 1 also includes a confirmation item sensor 56 and a confirmation plate sensor 57 on the conveying path 102 upstream of the picking-up unit 30 in the conveyance direction C. The confirmation item sensor 56 detects an item when the item conveyed on the conveying path 102 passes nearby. At the same time, the confirmation item sensor 56 detects the open-closed state of the lid 17 of the container 10 that passes nearby. The confirmation plate sensor 57 detects whether a plate 2 is present in the container 10 that passes nearby. The control unit 60 operates based on the detection results of the confirmation item sensor 56 and the confirmation plate sensor 57. Therefore, the control unit 60 can confirm whether the plate 2 was properly removed by the plate picking-up device 1.

In addition, the confirmation item sensor 56 and the confirmation plate sensor 57 are fixed to a second connecting arch member 55. The second connecting arch member 55 connects the confirmation item sensor 56 and the confirmation plate sensor 57 to the picking-up unit 30. Accordingly, both the sensors 56, 57 are fixed to have fixed relative positions. Therefore, the time from a timing at which an item is detected by the sensor 51 to a timing at which the item arrives at a position near the confirmation item sensor 56 and the confirmation plate sensor 57 can be accurately calculated.

The control unit 60 includes a central control unit (e.g., a CPU) that controls the plate picking-up device 1, and a memory (at least one of a RAM, a ROM, and a non-volatile memory medium that stores data even when power supply is cut off). In addition, the control unit 60 obtains various information from a database (an example of a storage device) 61. As one example, in the present embodiment, information such as a time when a food/drink is housed in each container 10 is stored in the database 61 in association with the identifier of the container 10. In the present embodiment, a convey start time at which the container 10 housing a food/drink is conveyed along the conveying path 102 is acquired as a conveyance start time at which the food/drink is housed in the container. The acquired conveyance start time is stored in the database 61. It should be noted that the database 61 may be disposed in an external device other than the plate picking-up device 1.

The gripping member 31 of the present embodiment will be described in detail with reference to FIGS. 7 and 8. FIG. 7 is a side view of the picking-up unit 30, the container 10, and the plate 2 (as viewed from the downstream side in the conveyance direction C of the conveying unit 102) at a timing immediately before the gripping member 31 grips the plate 2. FIG. 8 is a side view of the picking-up unit 30, the container 10, and the plate 2 at a timing immediately after the plate 2 was gripped by the gripping member 31 subsequent to the situation shown in FIG. 7.

As described above, in the present embodiment, the lid 17 of the container 10 is automatically opened by the lid opening member 27 (see FIGS. 2, 4 to 6). As a result, the lower part of the front side portion (i.e., the right side portion in FIGS. 7 and 8) of the plate 2 is laid on the stopper 13 of the container 10. As a result, a portion (a front side portion) of the plate 2 is pushed up by the lid opening member 27, and the plate 2 is held to be angled with respect to the horizontal direction H. The gripping member 31 includes an upper gripping piece 32 that contacts the circumferential edge of the plate 2 from an upper side and a lower gripping piece 33 that contacts the circumferential edge of the plate 2 from a lower side. In the present embodiment, a direction A in which the pair of the gripping pieces 32, 33 extend toward the plate 2 (in the present embodiment, the direction A in which the lower surface of the upper gripping piece 32 and the upper surface of the lower gripping piece 33 extend toward the conveying path 102) is slightly angled with respect to the horizontal direction H to have an angle (a first angle) equal to or close to an angle (a second angle) of the plate 2 which is tilted by the lid opening member 27 by raising the plate 2. As a result, when the gripping member 31 is moved to a position close to the circumferential edge of the plate 2 by the moving member 35 (i.e., when the gripping member 31 is in a state shown in FIG. 6), the angle at which the pair of gripping pieces 32, 33 extend has a value close to the angle at which the plate 2 is tilted. Therefore, the angle of the plate 2 is less likely to change before and after the circumferential edge of the plate 2 is gripped by the gripping member 31. Therefore, the plate 2 can be easily held in a stable state. In addition, the possibility that the plate 2 comes into contact with other parts (e.g., the lid 17, etc.) is reduced.

As shown in FIG. 7, in the present embodiment, when the gripping member 31 is moved horizontally to a position close to the circumferential edge of the plate 2 in the container 10, the upper gripping piece 32 is positioned above the circumferential edge of the plate 2. Furthermore, the lower gripping piece 33 is positioned below the circumferential edge of the plate 2. Then, the upper gripping piece 32 and the lower gripping piece 33 are brought closer to each other from the state shown in FIG. 6. As a result, the circumferential edge of the plate 2 is properly gripped by the gripping member. Furthermore, as shown in FIG. 8, in the present embodiment, the circumferential edge of the plate 2 is gripped by the upper gripping piece 32 and the lower gripping piece 33. At this time, the plate 2 is lifted slightly by the gripping member 31 from the position at which the plate 2 was located before gripped (i.e., the position of the plate 2 shown by the dotted line in FIG. 8). Therefore, even without providing a separate mechanism for moving the gripping member 31 up and down, the plate 2 can be slightly lifted from the setting holder 11 of the container 10 by simply gripping the circumferential edge of the plate 2 by the gripping member 31. Therefore, when the plate 2 is removed horizontally, the plate 2 is less likely to interfere with the setting holder 11 of the container 10.

In the present embodiment, the upper gripping piece 32 moves downward. At the same time, the lower gripping piece 33 moves upward. As a result, the plate 2 is gripped at a particular height by the upper gripping piece 32 and the lower gripping piece 33. However, it is also possible to change the configuration for causing the gripping member 31 to grip the plate 2. For example, the gripping member 31 may grip the circumferential edge of the plate 2 by moving only the lower gripping piece 33 upward while the position of the upper gripping piece 32 is kept. Even in this case, the plate 2 can be slightly lifted from the setting holder 11 of the container 10 by the gripping member 31 that simply grips the circumferential edge of the plate 2.

As shown in FIG. 8, the plate picking-up device 1 of the present embodiment removes the plate 2 from the container 10 as follows. The height of the plate 2 held by the gripping member 31 is kept within the vertical range of the gap formed between the upper surface of the setting holder 11 of the container 10 and the lower part of the lid 17 that is in the open state. Under this state, the gripped plate 2 is moved horizontally by the moving member 35. Therefore, when the plate 2 is removed from the container 10, the possibility that the plate 2 comes into contact with the lid 17 of the container 10 and the setting holder 11 is further appropriately reduced.

(Plate Removal Process)

Figure 9:
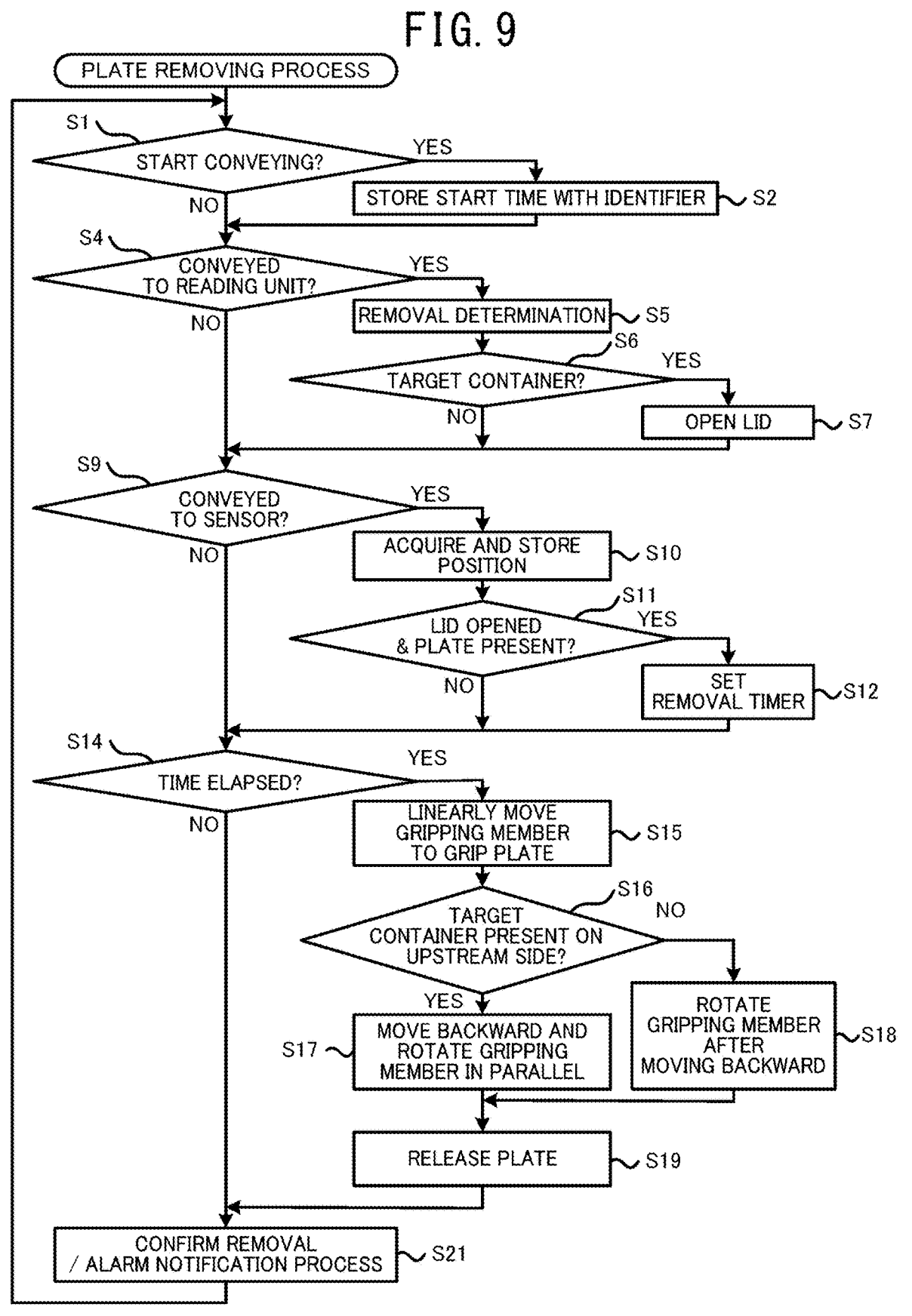

The plate removal process executed by the plate picking-up device 1 of the present embodiment will be described with reference to FIG. 9. The control unit 60 (i.e., the central control unit) of the plate picking-up device 1 executes a plate removal control program stored in the storage device. Accordingly, the plate removal process illustrated in FIG. 9 is executed.

First, the control unit 60 determines whether conveyance of the container 10 housing a food/drink along the conveying path 102 is started (S1). Detailed explanation will not be given, but in the restaurant conveying system 100, a reader (not shown) similar to the reading unit 45 (see FIGS. 4-6) is disposed to read the identifier 19 of the food/drink 10 that is to be conveyed soon. The reader is disposed at a position from which the container 10 is set on the conveying path 102. The container 10 arrives at the start position from which the container 10 is set on the conveying path 102 (S1: YES). The control unit 60 causes the database 61 to store the identifier read by the reading unit in association with the conveyance start time (S2). If the conveyance of the container 10 has not yet started (S1: NO), the process proceeds to S4.

The control unit 60 determines whether any of the containers 10 conveyed along the conveying path 102 arrives at an identifier-reading position where the identifier is read by the reading unit 45 (see FIGS. 4 to 6) (S4). If the container 10 has not arrived at the reading unit 45 (S4: NO), the process proceeds to S9. When the container 10 is conveyed to the reading unit 45 (S4: YES), the control unit 60 executes a removal determination to determine whether to remove the plate 2 from the container 10 that arrived at the reading unit 45 (S5). That is, at S5, the control unit 60 determines whether the container 10 that arrived at the reading unit 45 is a target container 10 from which the plate 2 is to be removed.

As an example, in the present embodiment, when the container 10 is conveyed to the identifier-reading position where the reading unit 45 reads identifiers, the reading unit 45 reads the identifier 19 of the container 10. As described above, the database 61 stores the conveyance start time of each container 10 in association with its identifier. At S5, the control unit 60 acquires, from the database 61, the conveyance start time associated with the identifier read by the reading unit 45. When the elapsed time from the acquired conveyance start time exceeds a threshold value, the control unit 60 determines that the plate should be removed from the container 10 (i.e., the target container).

Thereafter, if the container 10 that arrived at the reading unit 45 is not the target container (S6: NO), the process proceeds to S14. If the container 10 that arrived at the reading unit 45 is the target container (S11: YES), the control unit 60 controls the lid opening member 27 at a timing when the target container is conveyed to the lid opening member 27 by the conveying path 102. Accordingly, the lid 17 of the target container 27 is automatically opened (S7). The distance from the identifier-reading position where the reading unit 45 reads the identifier to the position where the lid opening member 27 opens the lid 17 is known in advance. The speed at which an item is conveyed on the conveying path 102 is also known. Therefore, the time required for the target container to arrive at a lid open position of the lid opening member 27 after the target container passed the identifier-reading position of the reading unit 45 is constant. Therefore, the control unit 60 controls the lid opening member 27 when a certain time has elapsed after the target container arrived at the identifier-reading position of the reading unit 45. As a result, the lid 17 can be automatically opened.

Next, the control unit 60 determines whether the item (including the container 10) conveyed along the conveying path 102 arrives at a sensing position by the sensor 51 (see FIGS. 4 to 6) (S9). As described above, in the present embodiment, the item sensor 52 included in the sensor 51 detects an item when the item conveyed on the conveying path 102 passes nearby the item sensor 52. If the item has not arrived at the sensing position of the sensor 51 (S9: NO), the process proceeds to S14. When an item arrives at the sensing position of the sensor 51 (S9: YES), the control unit 60 acquires, based on the detection result by the item sensor 52, the position of the item conveyed on the conveying path 102 that is conveyed nearby at least the plate picking-up device 1. Then, the obtained position of each item is stored in the database 61 (S10). The acquired position of the item is updated in accordance with the convey speed of the item along the conveying path 102 and the elapsed time.

Here, a situation is assumed where the item that arrived at the sensing position of the sensor 51 is a container 10. At that time, the control unit 60 determines whether the lid 17 of the container 10 that arrived at the sensing position is open, and whether plate 2 is placed in the container 10 (S11). As described above, the item sensor 52 detects the open-closed state of the lid 17 of the container 10 that is passing nearby the item sensor 52. The plate sensor 53 detects whether a plate 2 is present in the container 10 that is passing nearby the plate sensor 53. The determination at S11 is made based on the detection results by the item sensor 52 and the plate sensor 53.

If the lid 17 of the container 10 is not open, and if no plate 2 is placed in the container 10 (S11: NO), the container 10 that arrived at the sensing position is not the target container from which the plate 2 should be removed. In this case, the process proceeds to S14. When the lid 17 of the container 10 is open and plate 2 is placed in the container 10 (S11: NO), the container 10 having arrived at the sensing position is the target container with the lid 17 being opened by the lid opening member 27. Therefore, the control unit 60 sets a removal timer (S12) that measures a removal start time. The removal process (S14 to S19) for the plate 2 will stars when the removal timer counts up the removal start time. As described above, the distance on the conveying path 102 between the sensor 51 and the picking-up unit 30 is known. In addition, the speed at which the container 10 is conveyed through the conveying path 102 is also known. Therefore, the travel time from a timing at which an item (for example, the container 10 and the plate 2) is detected by the sensor 51 until the item arrives at the picking-up position by the picking-up unit 30 is constant. This travel time is set in the removal timer.

Next, the control unit 60 determines whether the removal timer is set in S12 and whether the set removal timer has elapsed (S14). If the removal timer has not been set, or if the removal timer has not elapsed (S14: NO), the process proceeds to S21. When the removal timer has elapsed (S14: YES), the target container arrives at a removal position where the picking-up unit 30 removes the plate 2. Therefore, the control unit 60 executes a process of controlling the gripping member 31 to grip the circumferential edge of the plate 2 (S15). At S15 of the present embodiment, the control unit 60 controls the linear movement portion 37 to linearly move the gripping member 31 a predetermined distance in a direction for approaching the conveying path 102 (i.e., the forward direction FD shown in FIG. 5). As a result, as shown in FIG. 7, the gripping member 31 moves to a position where the member 31 is able grip the circumferential edge of the plate 2. Therefore, when the gripping member 31 approaches the circumferential edge of the plate 2, the possibility that the gripping member 31 and so on come into contact with other members (e.g., the lid 17 of the container 10, etc.) is appropriately reduced. Thereafter, the control unit 60 controls the gripping member 31 to grip the circumferential edge of the plate 2.

Next, the control unit 60 determines whether to successively remove plates 2 from two containers (the target containers) 10 that are conveyed in a row on the conveying path 102 (S16). In detail, at S16 of the present embodiment, another target container may be placed on the conveying path 102 at a position upstream of the target container (hereinafter, referred to as a "specific target container") that has arrived at the plate picking-up position. At this time, the control unit 60 determines whether a first distance between the specific target container and the other target container is equal to or less than a threshold value. As one example, in the present embodiment, until the removal timer for the specific target container has elapsed (i.e., until the specific target container arrives at the plate picking-up position 2 for the picking-up unit 30 from the sensing position for the sensor 51), another removal timer is also set for the other target container. The first distance between the specific target container and the adjacent target container has a value equal to or less than a threshold value (in the present embodiment, equal to or less than the distance between the sensing position for the sensor 51 and the plate picking-up position). Therefore, in the present embodiment, when the removal timer is also set for the adjacent target container before the removal timer for the specific target container has elapsed, the control unit 60 determines that two plates 2 should be removed consecutively from the two target containers that are consecutively conveyed on the conveying path 102.

When the plates 2 are determined to be removed consecutively from the two target containers that are consecutively conveyed (S16), the control unit 60 executes the following parallel operation (S17). In other words, in the parallel operation, while the circumferential edge of the plate 2 is gripped by the gripping member 31, the operation where the linear movement portion 37 moves the gripping member 31 (in the present embodiment, the gripping member 31 and the rotational movement portion 36) in a direction away from the conveying path 102 (i.e., the backward direction BD shown in FIG. 6) and the operation where the rotational movement portion 36 rotates the gripping member 31 in the rotational direction R are performed in parallel (i.e., together). With the parallel operation, the time required from start to completion of removal of the plate 2 (hereinafter, referred to as a "collection time") can be reduced as compared to a situation one of the linear movement portion 37 and the rotational movement portion 36 starts moving the gripping member 31 and then the other starts moving the gripping member 31 (for example, when performing a stepwise operation, as will be described later). Therefore, even when a plurality of plates 2 are removed from the plural target containers that are consecutively conveyed on the conveying path 102, the plates can be removed more smoothly. In other words, a situation where the plate 2 is not able to be removed in time from the specific target container since it takes a longer time to remove a plate from the specific target container located upstream of the target container can be appropriately avoided.

On the other hand, if the plates 2 are not removed consecutively from the two target containers that are conveyed (S16: NO), the control unit 60 executes the stepwise operation (S18). In the stepwise operation, while the circumferential edge of the plate 2 is gripped by the gripping member 31, the linear movement portion 37 moves the gripping member 31 (in the present embodiment, the gripping member 31 and the rotational movement portion 36) linearly in a direction away from the conveying path 102 (the backward direction BD shown in FIG. 6), and then the rotational movement portion 36 rotates the gripping member 31 in the rotational direction R. According to the stepwise operation, the plate 2 gripped by the gripping member 31 is once linearly separated away from the conveying path 102 and then rotated and moved by the rotational movement portion 36. Therefore, the possibility that the plate 2 being rotated and moved by the rotational movement portion 36 comes into contact with the container 10 from which the plate 2 was removed and comes into contact with an item (e.g., the container 10, etc.) adjacent to the target container on a downstream or upstream side in the conveyance direction C can be reduced. This makes it easier to remove the plate 2.

When the plate 2 is removed from the target container at S17 or S18, the control unit 60 controls the gripping member 31 to release the grip of the circumferential edge of the plate 2 during or after the moving member 35 has completed moving the plate 2 (S19). As a result, the plate 2 is appropriately guided to the collecting member 40 (see FIGS. 4 to 6). In detail, at S19 of the present embodiment, the control unit 60 controls the gripping member 31 to release the grip of the circumferential edge of the plate 2 at a predetermined timing while the gripping member 31 is being moved horizontally by the moving member 35 at S17 or S18. Accordingly, the plate is thrown toward the collecting member 40. Therefore, the time required from start of removing the plate 2 to completion of collecting the plate 2 is appropriately reduced as compared to a situation where the grip of the plate 2 is released after the movement of the gripping member 31 was stopped. Therefore, even when the plates 2 are removed successively from a plurality of target containers that are conveyed on the conveying path 102, the plates can be removed more smoothly. Thereafter, the control unit 60 controls the rotational movement portion 36 to rotate the gripping member 31 in a direction opposite to the rotational direction R shown in FIG. 6. Accordingly, the position of the gripping member 31 is returned to the standby position (i.e., the position shown in FIG. 4) where collection of the plate 2 in the container 10 can be performed again. Then, the process proceeds to S21.

Next, the control unit 60 confirms whether the plate 2 was normally removed from the target container based on the detection results by the confirmation item sensor 56 and the confirmation plate sensor 57 (see FIGS. 4 to 6). If the plate 2 is not normally removed from the target container, the control unit 60 executes an alarm notification process (S21). During the alarm notification process, a notification by at least one of a sound, a display of an alarm image, and an illumination is made to employees of the restaurant. Therefore, even if the plate picking-up device 1 fails to remove the plate 2, the employee can collect the plate 2. In addition, during the processing of S21, when the confirmation item sensor 56 detects the open state of the lid 17 of the container 10 and the confirmation plate sensor 57 detects that the plate 2 remains in the container 10, the control unit 60 determines that the plate 2 was not normally removed from the target container. Thereafter, the process returns to S1, and the processes from S1 to S21 are repeated.

As described above, according to the plate picking-up device 1 of the present embodiment, the gripping member 31 is moved horizontally to a position close to the circumferential edge of the plate 2 set inside the container 10 on the conveying path 102. Therefore, when the gripping member 31 reaches the plate 2, other members of the plate picking-up device 1 (such as the gripping member 31) are unlikely to come into contact with the lid 17 of the container 10, the setting holder 11, and the like. The gripping member 31 grips the circumferential edge of the plate 2 in the vertical direction. As a result, the plate 2 is held in a more stable state as compared to a situation where the plate 2 is held by a member that is in contact with only the top surface of the plate 2. Furthermore, with the circumferential edge of the plate 2 being gripped by the gripping member 31, the plate 2 is moved horizontally from the container 10. Therefore, when the plate 2 is moved, the plate 2 is less likely to come into contact with the lid 17 of the container 10, etc. Therefore, the plate 2 is automatically and appropriately removed from the container 10.

The techniques disclosed in the above embodiments are merely examples. Therefore, the techniques illustrated in the above embodiments can be modified. For example, it is possible to implement only a part of the techniques exemplified in the above embodiments.

Specifically, in the above embodiment, the plate picking-up device 1 includes both the rotational movement portion 36 and the linear movement portion 37. However, the plate picking-up device 1 may include only one of the rotational movement portion 36 and the linear movement portion 37. Even in this case, the plate 2 is automatically and appropriately removed from the container 10.

When the plate 2 is removed from the target container, the method selectively using a process of executing the parallel operation (i.e., the parallel operating process) and a process of executing the stepwise operation (i.e., the stepwise operating process) may also be used. As mentioned above, the control unit 60 is able to obtain the position of each of items being conveyed on the conveying path 102. If the control unit 60 determines that another item is consecutively conveyed after the target container in the conveyance direction C, the stepwise operation may be performed to remove the plate 2 from the target container. As described above, by executing the stepwise operating process, the possibility that the plate 2 being rotated by the rotational movement portion 36 comes into contact with an item downstream of the target container in the conveyance direction C is reduced. Therefore, even if the item exists adjacent to the target container on the downstream side in the conveyance direction C, the plate 2 can be smoothly removed from the target container. In addition, in the above embodiment, regardless of whether there is another item adjacent to the target container on the downstream side in the conveyance direction C, when the plates 2 are not to be removed consecutively from the two adjacent target containers (S16: NO), the stepwise operating process is always executed. Therefore, in the above embodiment, it is possible to omit the process of acquiring the position of each of items that are conveyed on the conveying path 102.

The process of causing the gripping member 31 to grip the plate 2 at S15 of FIG. 9 is an example of a "gripping step." The process of removing the plate 2 from the container 10 at S17 and S18 is an example of a "removing step." The process of determining at S5 whether to remove the plate is an example of a "determination step." The process of acquiring the position of the item on the conveying path 102 at S10 is an example of a "position acquisition step." The process of releasing the grip of the plate by the gripping member 31 at S19 is an example of a "collecting step". The process of opening the lid 17 by the lid opening member 27 at S7 is an example of an "opening step."

The invention claimed is:

1. A plate picking-up device that removes a plate from a container having a lid on a conveying path on which items including the container are conveyed along a predetermined conveyance direction, the plate picking-up device comprising:

a gripping member that is configured to grip a circumferential edge of the plate;

a moving member that is configured to move the gripping member at least in a horizontal direction, wherein the moving member includes a rotational movement portion that is configured to rotate the gripping member about a rotation axis extending in a vertical direction; and a control unit that is configured to:

control the moving member to move the gripping member in the horizontal direction to the circumferential edge of the plate placed in the container with the lid being open, and then control the gripping member to grip the circumferential edge of the plate;

control the moving member to remove the plate in the horizontal direction from the container while the circumferential edge of the plate is being gripped by the gripping member; and control the moving member to move the plate away from the container by the rotational movement portion rotating the gripping member in a direction following the conveyance direction while the circumferential edge of the plate is being gripped by the gripping member.

2. The plate picking-up device according to claim 1, wherein the moving member includes a linear movement portion that is configured to linearly move the gripping member in a direction for changing a distance between the gripping member and the conveying path.

3. The plate picking-up device according to claim 2, wherein the control unit is further configured to perform a parallel operation by concurrently controlling, while the circumferential edge of the plate is being gripped by the gripping member:

the linear movement portion to linearly move the gripping member away from the conveying path; and the rotational movement portion to rotate the gripping member.

4. The plate picking-up device according to claim 3, wherein the control unit is further configured to:

determine, on each of containers conveyed on the conveying path, whether to remove the plate from each of containers; and when two plates are determined to be consecutively removed from two adjacent containers among the containers that are conveyed in a row, perform the parallel operation on at least a following container of the two adjacent containers that is located downstream of a preceding container of the two adjacent containers in the conveyance direction.

5. The plate picking-up device according to claim 2, wherein the control unit is further configured to perform a stepwise operation by controlling, while the circumferential edge of the plate is being gripped by the gripping member:

the linear movement portion to linearly move the gripping member away from the conveying path; and then the rotational movement portion to rotate the gripping member.

6. The plate picking-up device according to claim 5, wherein the control unit is further configured to:

determine, on each of containers, whether the plate is to be removed from each of the containers that are conveyed on the conveying path;

acquire a position of each of the items that are conveyed on the conveying path; and perform the stepwise operation on the container from which the plate is determined to be removed from the container when another item is present adjacent to the container at a position downstream of the container.

7. The plate picking-up device according to claim 1, wherein the control unit is further configured to: control the gripping member to release and guide the plate toward a collecting member that is configured to collect the plate.

8. The plate picking-up device according to claim 7, wherein the control unit is further configured to control the gripping member to throw the plate to the collecting member by controlling the gripping member to release the plate while the moving member is moving the gripping member.

9. The plate picking-up device according to claim 7, further comprising a guide cover that is disposed at a position to which the plate is thrown from the gripping member, wherein the guide cover is configured to receive and guide the plate to the collecting member.

10. The plate picking-up device according to claim 1, further comprising a position guide that is disposed at a position adjacent to a picking-up unit including the gripping member and the moving member, wherein the position guide is configured to guide the container in a direction intersecting the conveyance direction of the conveying path when the container contacts the position guide, and the control unit is further configured to control the moving member to move the gripping member in the horizontal direction with respect to the container that was guided by the position guide in the direction intersecting the conveyance direction of the conveying path.

11. The plate picking-up device according to claim 1, further comprising a lid opening member that is disposed at a position upstream of a picking-up unit including the gripping member and the moving member, wherein the container includes an open/close mechanism, and the lid opening member is configured to raise a portion of the plate in the container to open the lid of the container in collaboration with the open/close mechanism.

12. The plate picking-up device according to claim 11, wherein the gripping member includes an upper gripping piece and a lower gripping piece that are configured to clamp the circumferential edge of the plate in a vertical direction, the upper gripping piece and the lower gripping piece extend at a first angle, and the lid opening member is configured to tilt the plate at a second angle close to the first angle.

13. The plate picking-up device according to claim 11, wherein a sensor is disposed in the conveying path between the picking-up unit and the lid opening member to detect whether the lid of the container is opened or closed and whether the plate is present in the container, the control unit is further configured to:

determine, on each of containers, whether the plate is to be removed from each of the containers that are conveyed on the conveying path;

control the lid opening member to open the lid when the plate is determined to be removed from the container and the container is conveyed to reach the lid opening member by the conveying path, and the control unit is further configured to control the moving member and the gripping member to remove the plate from the container when the sensor detects that the lid is opened and the plate is present in the container and when the container is conveyed to arrive at a picking-up position where the gripping member is able to grip the plate.

14. The plate picking-up device according to claim 13, further comprising a connecting member that is configured to connect the sensor to the picking-up unit to fix relative positions of the sensor and the picking-up unit.

15. The plate picking-up device according to claim 1, wherein the gripping member includes an upper gripping piece that is brought into contact with the circumferential edge of the plate on an upper side of the plate and a lower gripping piece that is brought into contact with the circumferential edge of the plate on a lower side of the plate, the upper gripping piece is positioned above the circumferential edge of the plate and the lower gripping piece is positioned below the circumferential edge of the plate when the gripping member is moved in the horizontal direction to the circumferential edge of the plate in the container, and the gripping member raises the plate when the upper gripping piece and the lower gripping piece clamp the circumferential edge of the plate.

16. A plate picking-up device that removes a plate from a container having a lid on a conveying path on which items including the container are conveyed along a predetermined conveyance direction, the plate picking-up device comprising:

a gripping member that is configured to grip a circumferential edge of the plate;

a moving member that is configured to move the gripping member at least in a horizontal direction; and a control unit that is configured to:

control the moving member to move the gripping member in the horizontal direction to the circumferential edge of the plate placed in the container with the lid being open, and then control the gripping member to grip the circumferential edge of the plate;

control the moving member to remove the plate in the horizontal direction from the container while the circumferential edge of the plate is being gripped by the gripping member;

control the gripping member to release and guide the plate toward a collecting member that is configured to collect the plate; and control the gripping member to throw the plate to the collecting member by controlling the gripping member to release the plate while the moving member is moving the gripping member.

17. The plate picking-up device according to claim 16, further comprising a guide cover that is disposed at a position to which the plate is thrown from the gripping member, wherein the guide cover is configured to receive and guide the plate to the collecting member.

18. A plate picking-up device that removes a plate from a container having a lid on a conveying path on which items including the container are conveyed along a predetermined conveyance direction, the plate picking-up device comprising:

a gripping member that is configured to grip a circumferential edge of the plate;

a moving member that is configured to move the gripping member at least in a horizontal direction; and a control unit that is configured to:

control the moving member to move the gripping member in the horizontal direction to the circumferential edge of the plate placed in the container with the lid being open, and then control the gripping member to grip the circumferential edge of the plate; and control the moving member to remove the plate in the horizontal direction from the container while the circumferential edge of the plate is being gripped by the gripping member, wherein the gripping member includes an upper gripping piece that is brought into contact with the circumferential edge of the plate on an upper side of the plate and a lower gripping piece that is brought into contact with the circumferential edge of the plate on a lower side of the plate, the upper gripping piece is positioned above the circumferential edge of the plate and the lower gripping piece is positioned below the circumferential edge of the plate when the gripping member is moved in the horizontal direction to the circumferential edge of the plate in the container, and the gripping member raises the plate when the upper gripping piece and the lower gripping piece clamp the circumferential edge of the plate.

* * * * *